United States Patent
Kuroda et al.

(10) Patent No.: US 10,892,640 B2
(45) Date of Patent: Jan. 12, 2021

(54) VOLTAGE AND REACTIVE POWER MONITORING/CONTROL DEVICE AND METHOD FOR CALCULATING REQUIRED REACTIVE POWER AMOUNT FOR SUPPRESSING A FLUCTUATION COMPONENT AND SELECTING AN APPROPRIATE EQUIPMENT

(71) Applicant: Hitachi, Ltd., Tokyo (JP)

(72) Inventors: Eisuke Kuroda, Tokyo (JP); Toshiyuki Miyake, Tokyo (JP); Nao Saito, Tokyo (JP); Masahiro Yatsu, Tokyo (JP); Taichirou Kawahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/099,448

(22) PCT Filed: Mar. 21, 2017

(86) PCT No.: PCT/JP2017/011175
§ 371 (c)(1),
(2) Date: Nov. 7, 2018

(87) PCT Pub. No.: WO2017/221483
PCT Pub. Date: Dec. 28, 2017

(65) Prior Publication Data
US 2019/0148977 A1    May 16, 2019

(30) Foreign Application Priority Data

Jun. 20, 2016 (JP) .................... 2016-121478

(51) Int. Cl.
*H02J 3/18* (2006.01)
*H02J 13/00* (2006.01)
(Continued)

(52) U.S. Cl.
CPC ............ *H02J 13/0013* (2013.01); *H02J 3/00* (2013.01); *H02J 3/16* (2013.01); *H02J 3/18* (2013.01);
(Continued)

(58) Field of Classification Search
CPC .......... H02J 13/0013; H02J 3/00; H02J 13/00; H02J 3/18; H02J 3/16; Y04S 10/24;
(Continued)

(56) References Cited

U.S. PATENT DOCUMENTS

| | | | | |
|---|---|---|---|---|
| 2007/0035135 | A1* | 2/2007 | Yoshida | F03D 7/0284 290/44 |
| 2015/0214741 | A1* | 7/2015 | Kuroda | H02J 3/24 700/298 |
| 2018/0123388 | A1 | 5/2018 | Itaya | |

FOREIGN PATENT DOCUMENTS

| | | |
|---|---|---|
| EP | 1 035 626 A2 | 9/2000 |
| EP | 2 863 285 A2 | 4/2015 |

(Continued)

OTHER PUBLICATIONS

Ishida (JPH08280135A)—machine translation retrieved from www.google.com on Jan. 6, 2020 (Year: 1996).*

(Continued)

*Primary Examiner* — Robert E Fennema
*Assistant Examiner* — Marzia T Monty
(74) *Attorney, Agent, or Firm* — Mattingly & Malur, PC

(57) ABSTRACT

The voltage and reactive power monitoring/control method includes: measurement data for the power system and data for the system equipment of the power system are used to calculate the system status for the power system at the time of measurement; data for a status estimation calculation result and predicted data for the power generation and load of the power system are used to predictively calculate a (Continued)

system status at a future time from the time of the power system measurement; a fluctuation component is obtained for the predicted value of the data obtained from the power system; the reactive power required to suppress the fluctuation component is obtained, as a required reactive power amount; a reactive power distribution subject is selected from a plurality of pieces of control subject equipment; an output distribution calculation is performed for the required reactive power amount for the selected control subject equipment.

16 Claims, 12 Drawing Sheets

(51) Int. Cl.
  *H02J 3/16* (2006.01)
  *H02J 3/00* (2006.01)
(52) U.S. Cl.
  CPC ............. *H02J 13/00* (2013.01); *Y02E 40/30* (2013.01); *Y02E 40/70* (2013.01); *Y02E 60/00* (2013.01); *Y04S 10/00* (2013.01); *Y04S 10/22* (2013.01)
(58) Field of Classification Search
  CPC ....... Y04S 10/22; Y02E 40/74; Y02E 60/726; Y02E 40/34
  See application file for complete search history.

(56) References Cited

FOREIGN PATENT DOCUMENTS

| JP | 07-288932 | A |   | 10/1995 |
| JP | 08-149895 | A |   | 6/1996 |
| JP | 08-280135 | A |   | 10/1996 |
| JP | 08280135 | A | * | 10/1996 |
| JP | 2000-4541 | A |   | 1/2000 |
| JP | 2002-199579 | A |   | 7/2002 |
| JP | 2002199579 | A | * | 7/2002 |
| JP | 2002-262459 | A |   | 9/2002 |
| JP | 2003-259554 | A |   | 9/2003 |
| JP | 2015-73411 | A |   | 4/2015 |
| JP | 2016-101074 | A |   | 5/2016 |
| JP | 2016101074 | A | * | 5/2016 |
| JP | 5933857 | B1 |   | 6/2016 |
| WO | 2016/170912 | A1 |   | 10/2016 |

OTHER PUBLICATIONS

Myoga (JP2002199579A)—machine translation retrieved from www.google.com on Jan. 6, 2020 (Year: 2002).*
Itaya (JP2016101074A)—machine translation retrieved from www.google.com on Jan. 6, 2020 (Year: 2016).*
International Search Report of PCT/JP2017/011175 dated June 20, 2017.
Extended European Search Report received in corresponding European Application No. 17814955.5 dated Jan. 21, 2020.
"Reactive power flow at the interconnection point approaches the reference value" The Institute of Electrical Engineers of Japan, Voltage Stability Maintenance Measures of Electric Power System, Technical Report of the Institute of Electrical Engineers of Japan, II-73, 1979, pp. 37-44.
Takashi Yoshida, Keihanna Eco City Jisedai Energy Shakai System Jissho Project Suishin Kyogikai, Smart Energy Network Saizensen, 1st edition, 1st print, NTS Inc., Apr. 27, 2012, pp. 114-119.
Japanese Office Action received in corresponding Japanese Application No. 2016-121478 dated Oct. 27, 2020.

* cited by examiner

[FIG. 1]
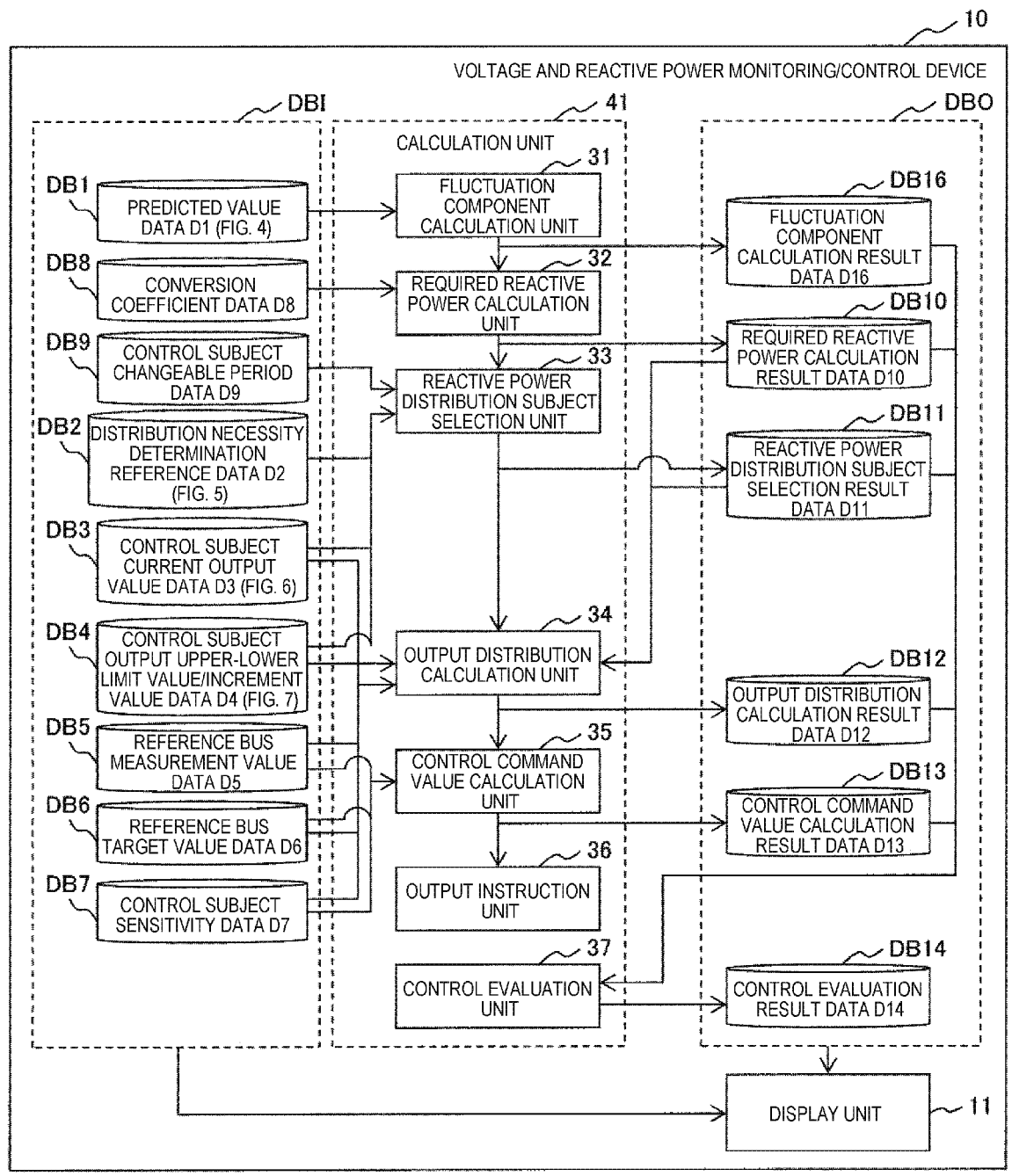

[FIG. 2]
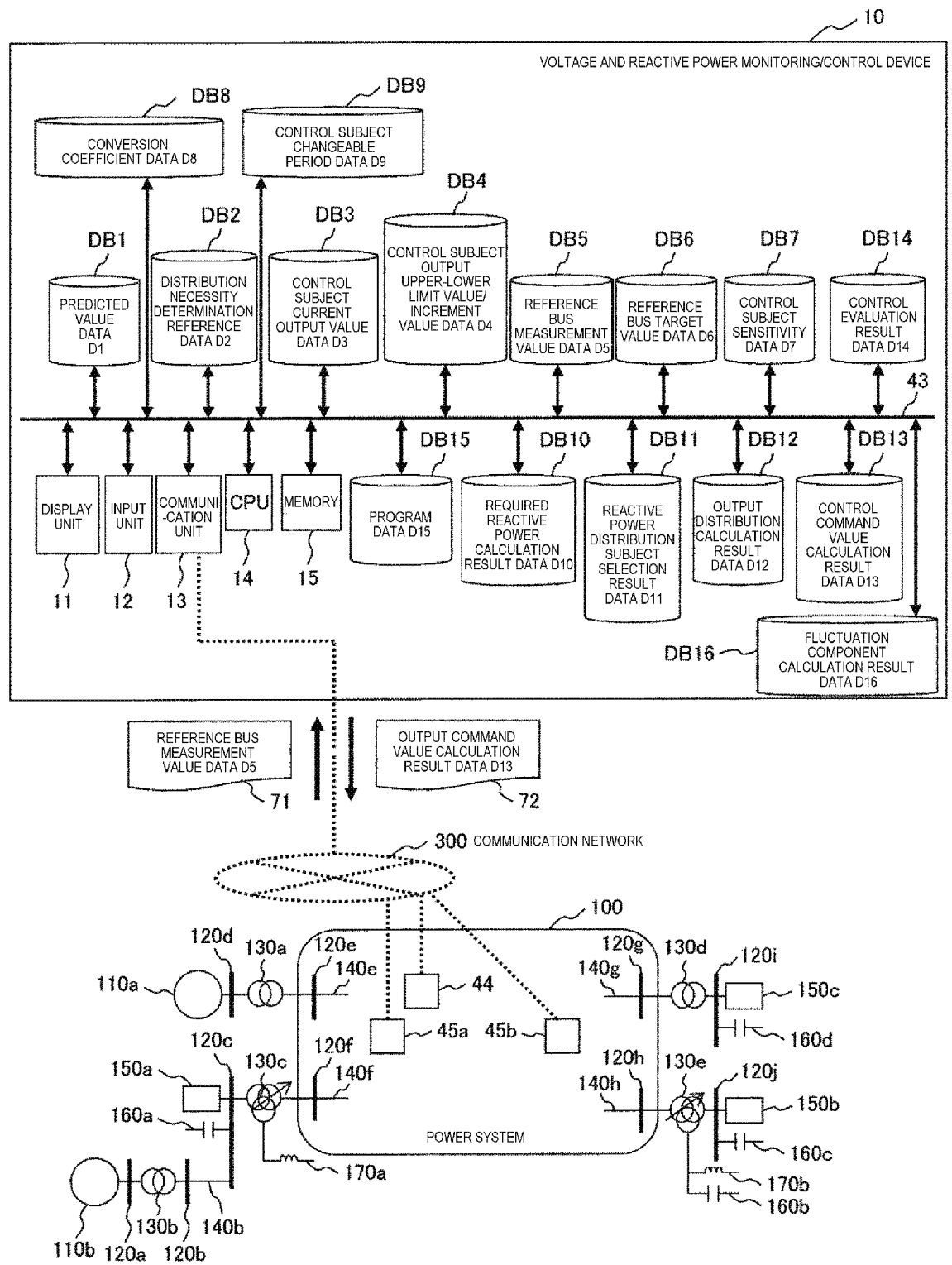

[FIG. 3]
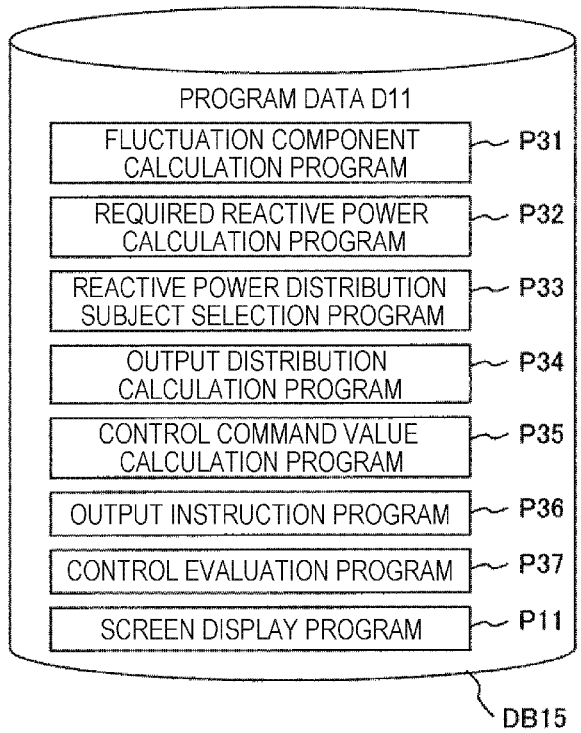
[FIG. 4]
| TIME [s] | VOLTAGE [p.u.] | | | DEMAND[p.u.] | | | | | |
|---|---|---|---|---|---|---|---|---|---|
| | | | | ACTIVE POWER | REACTIVE POWER | ACTIVE POWER | REACTIVE POWER | ... | ... |
| | V1 | V2 | ... | PL1 | QL1 | PL2 | QL2 | ... | ... |
| t1 | XX | XX | ... | XX | XX | XX | XX | ... | ... |
| t2 | XX | XX | ... | XX | XX | XX | XX | ... | ... |
| : | : | : | : | : | : | : | : | : | : |
DB1
[FIG. 5]
| | REFERENCE |
|---|---|
| FLUCTUATION 1 | *** |
| FLUCTUATION 2 | *** |
| FLUCTUATION 3 | *** |
| : | : |
DB2

[FIG. 6]

| TIME [s] | OUTPUT OF GENERATOR [p.u.] | | | | ... | OUTPUT OF REACTIVE POWER SUPPLY DEVICE [p.u.] | | | | ... | ... |
|---|---|---|---|---|---|---|---|---|---|---|---|
| | ACTIVE POWER | REACTIVE POWER | ACTIVE POWER | REACTIVE POWER | ... | ACTIVE POWER | REACTIVE POWER | ACTIVE POWER | REACTIVE POWER | ... | ... |
| | PG1 | QG1 | PG2 | QG2 | ... | PG1 | QG1 | PG2 | QG2 | ... | ... |
| t1 | XX | XX | XX | XX | ... | XX | XX | XX | XX | ... | ... |
| t2 | XX | XX | XX | XX | ... | XX | XX | XX | XX | ... | ... |
| : | : | : | : | : | : | : | : | : | : | : | : |

| | UPPER LIMIT VALUE | LOWER LIMIT VALUE | INCREMENT VALUE |
|---|---|---|---|
| GENERATOR 1 | $Qg1max$ | $Qg1min$ | 0.01 |
| GENERATOR 2 | $Qg2max$ | $Qg2min$ | 0.01 |
| REACTIVE POWER SUPPLY DEVICE 1 | $Qc1max$ | $Qc1min$ | 0.1 |
| REACTIVE POWER SUPPLY DEVICE 2 | $Qc2max$ | $Qc2min$ | 0.1 |
| : | : | : | : |

DB4

[FIG. 8]
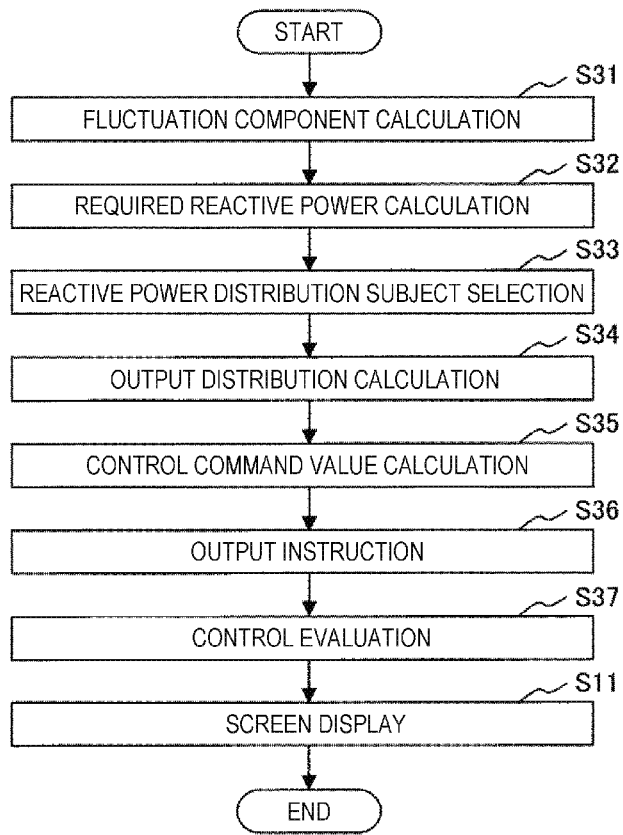
[FIG. 9]
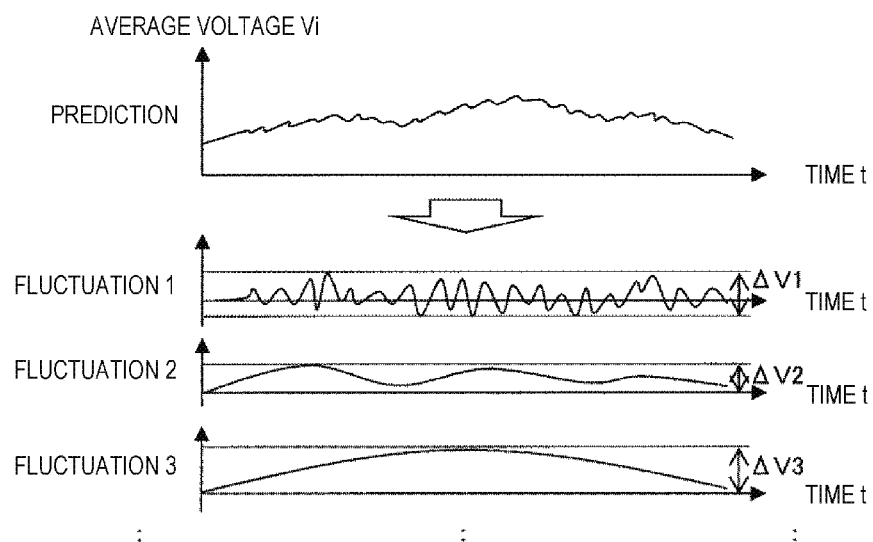

[FIG. 10]
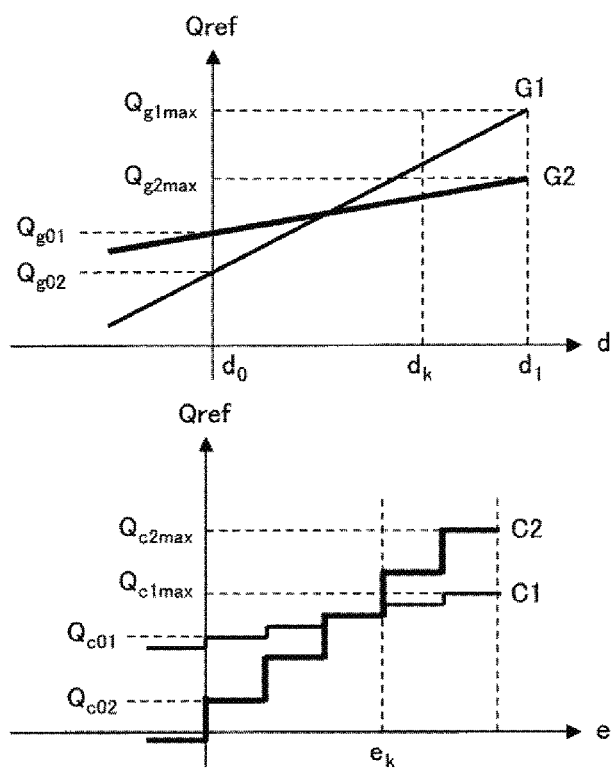

[FIG. 11]
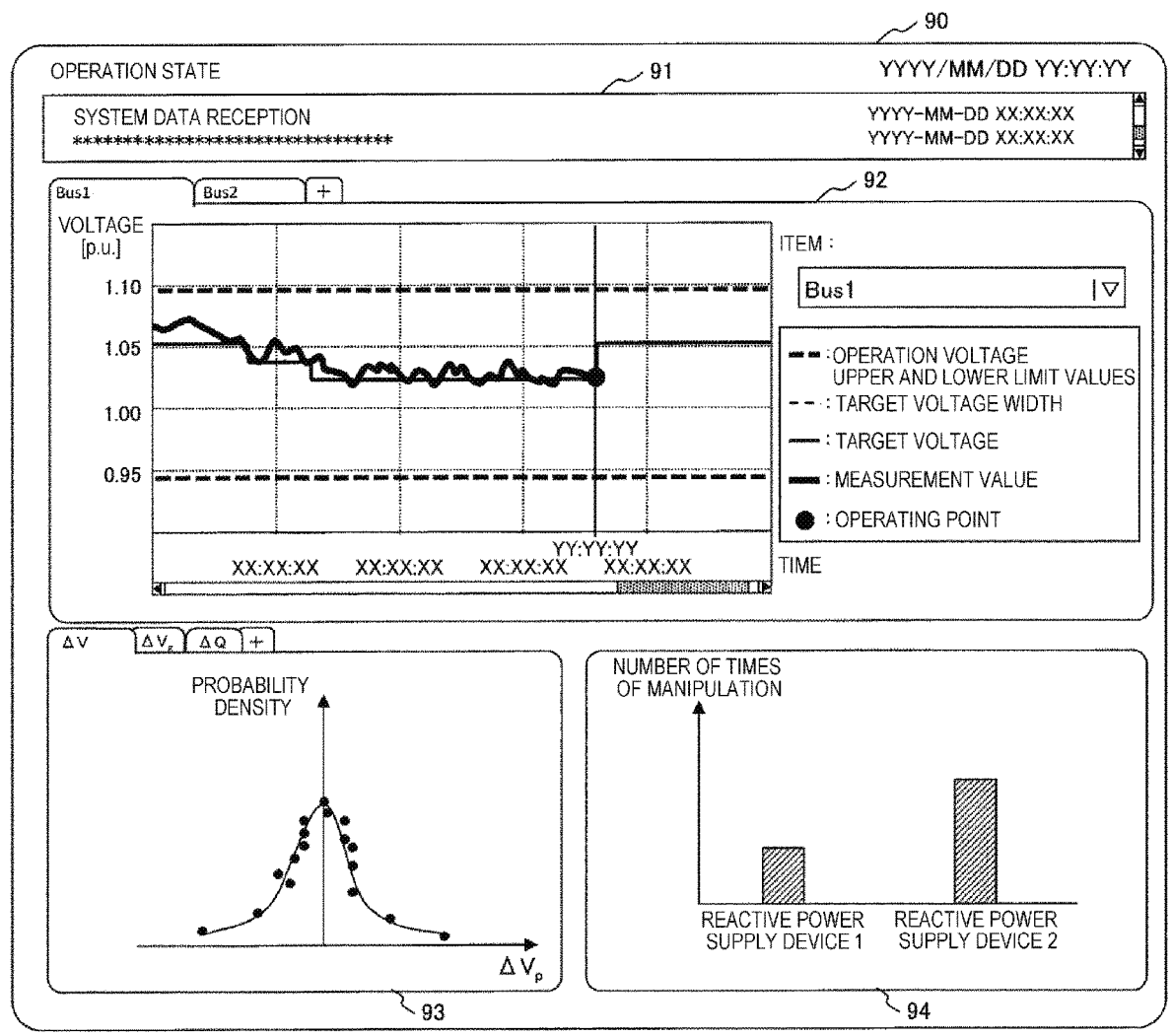

[FIG. 12]
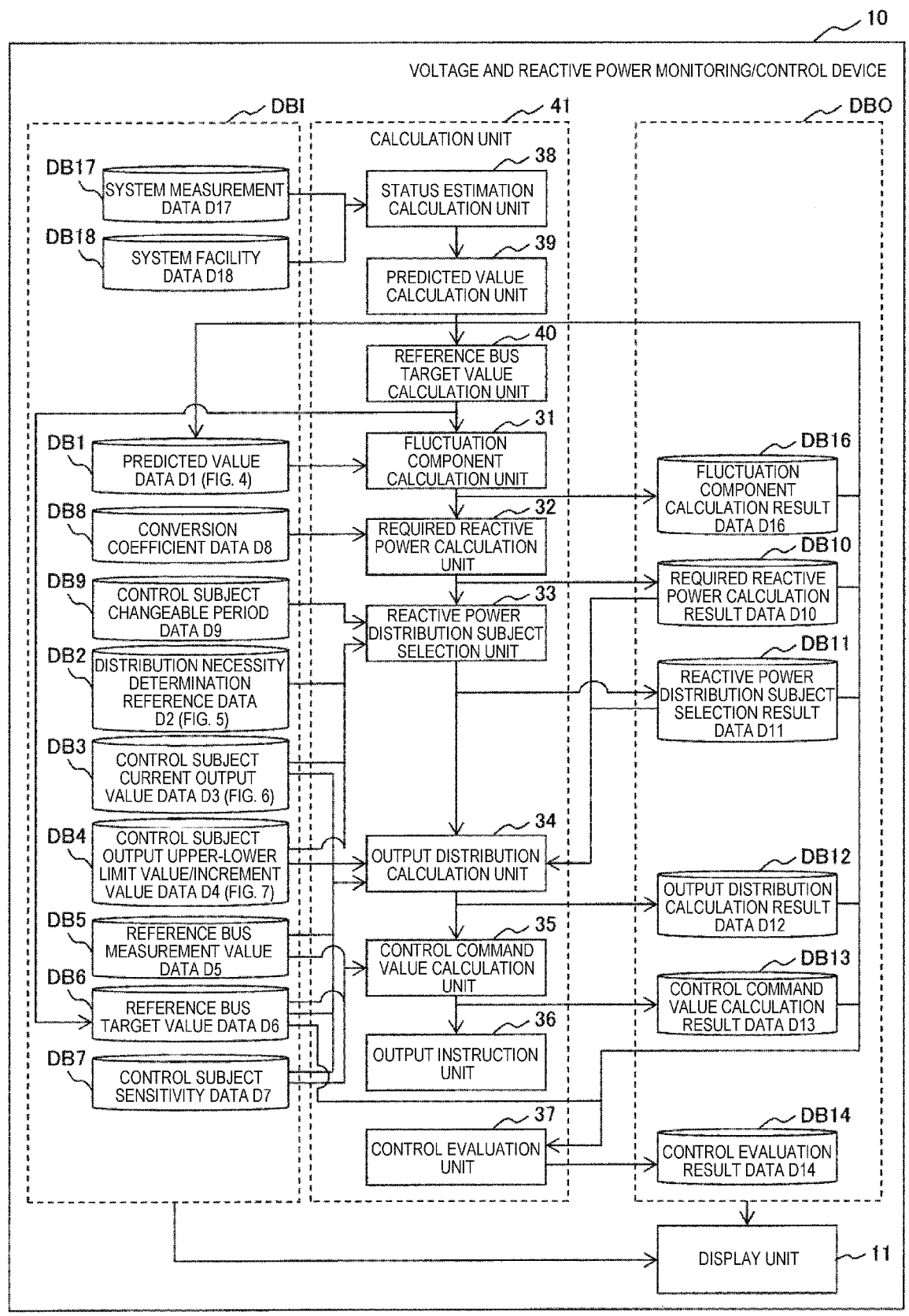

[FIG. 13]
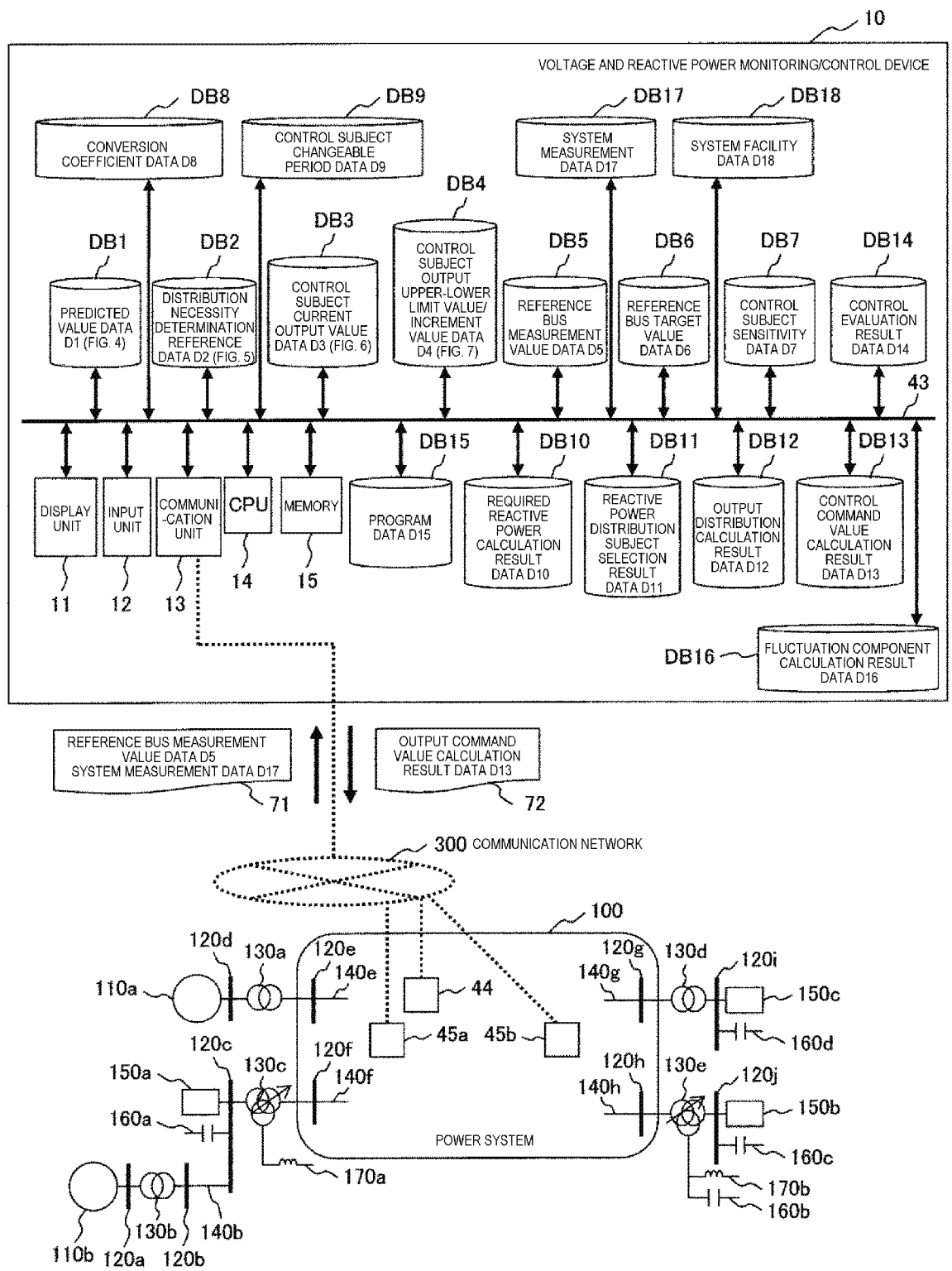

[FIG. 14]
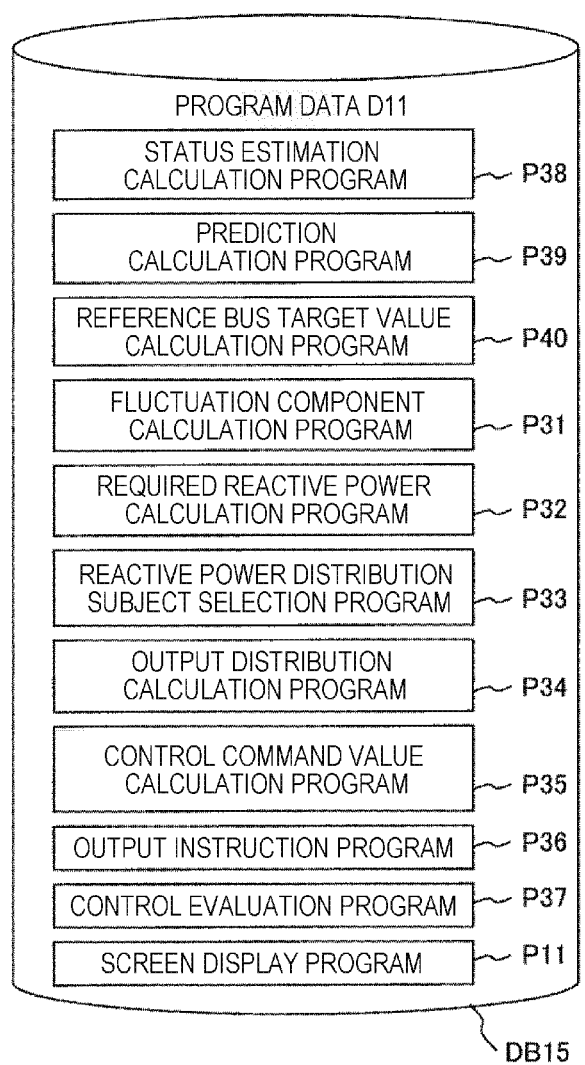

[FIG. 15]
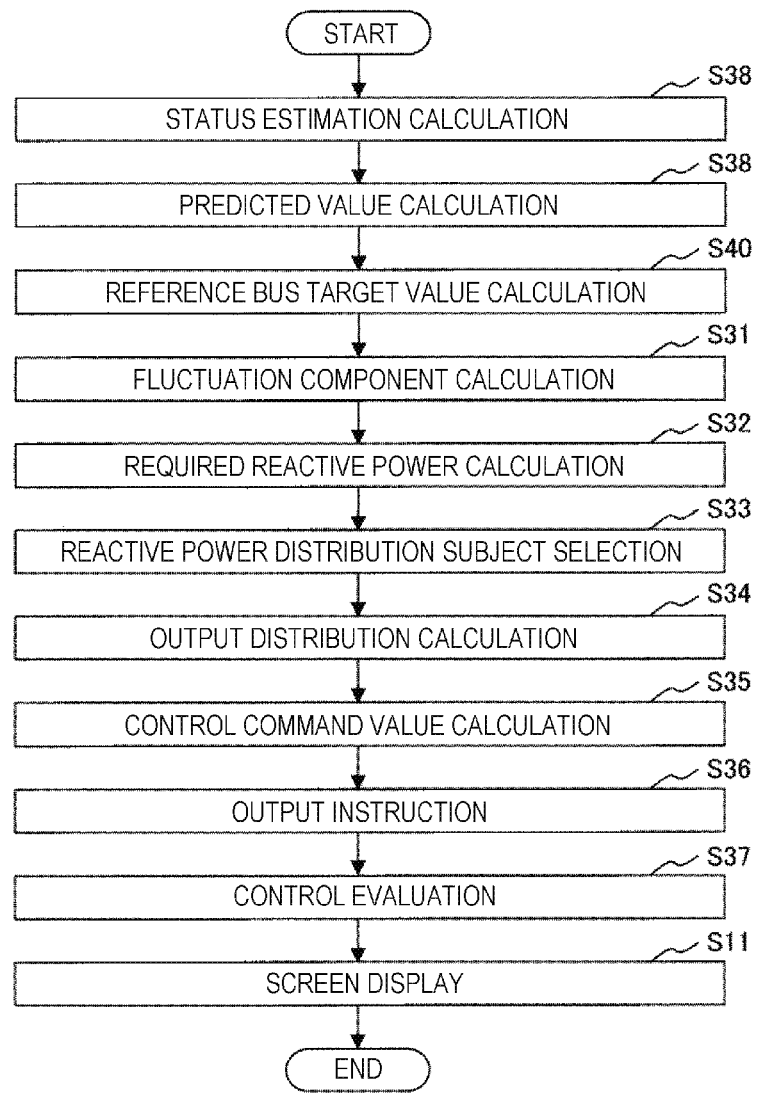

[FIG. 16]
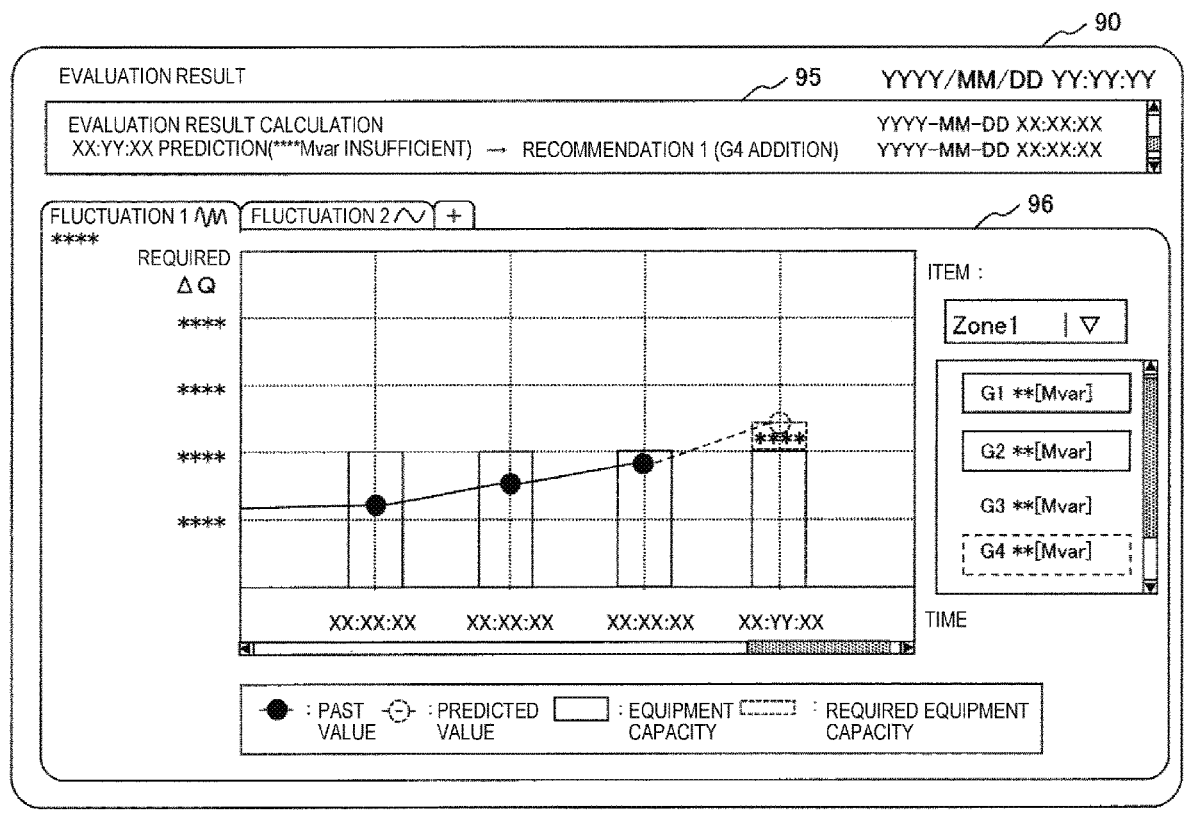

VOLTAGE AND REACTIVE POWER MONITORING/CONTROL DEVICE AND METHOD FOR CALCULATING REQUIRED REACTIVE POWER AMOUNT FOR SUPPRESSING A FLUCTUATION COMPONENT AND SELECTING AN APPROPRIATE EQUIPMENT

TECHNICAL FIELD

The present invention relates to a voltage and reactive power monitoring/control device and method for a power system for monitoring a status of the power system and maintaining balance between a voltage and a reactive power.

BACKGROUND ART

PTLs 1 to 3 and Non-PTL 1 disclose voltage and reactive power monitoring/control devices and methods for a power system for monitoring a status of the power system and maintaining balance between a voltage and a reactive power.

Among the above PTLs, a technique disclosed in PTL 1 (JP-A-8-280135) includes "a power system as a subject, a data reading device that reads a necessary data from the power system, a status estimation device that estimates a likely system status of the time point from the read data, a power system partial system division calculation device as a pre-process for performing voltage and reactive power control, a future system power flow state prediction device that predicts a future power system ahead for several hours from the status estimation device, and a reactive power distribution instruction device that issues an instruction to a manipulation equipment based on the result of the reactive power optimum distribution calculation device that selects a voltage and reactive power control device to be manipulated for optimum distribution of the reactive power from the predicted power flow state obtained from the device" (refer to Abstract). In addition, PTL 1 also discloses the contents of Non-PTL 1 as a background technique in this technical field.

A technique disclosed in PTL 2 (JP-A-7-288932) includes "a unit for calculating an index indicating a control effect of a generator and a reactive power supply device with respect to a reactive power flow of a monitoring subject bus voltage and a monitoring subject transmission line in the voltage and reactive power control of the power system, a unit for calculating a control weighting coefficient of the generator according to the power system state in order to introduce constraint conditions for system operation among the control weighting coefficients of the respective control devices indicating the control priority, and a unit for calculating the reactive power control amounts of the generator and the reactive power supply device by using the index representing the adjustment effect and the control weighting coefficient" (refer to Abstract). In addition, it is disclosed that "the control of the LRT and the reactive power supply device can be controlled by applying the generator control and the control cooperation of the reactive power supply device by shifting $\Delta V0$".

PTL 3 (JP-A-2003-259554) discloses that "the median deviation weighted objective function creating unit 19 create an objective function that incorporates the deviation weighted sum of squares term from the median of the adjustable range of the voltage and reactive power adjustment equipment 3 based on the power system information obtained by the power system information grasping unit 11. The control amount calculating unit 12 calculates the control amount of the voltage and reactive power adjustment equipment 3 so that the bus voltage and the reactive power flow to be monitored is within the allowable value by the objective function incorporating the term of the deviation weighted sum of squares, and performs instruction output of the control amount to the voltage and reactive power adjustment equipment 3 via the instruction output unit 14 and the information transmission devices 4c and 4d. With such a configuration, the control margin amount of the voltage and reactive power adjustment equipment is secured "(refer to Abstract). In PTL 3, it is disclosed that "in the voltage and reactive power monitoring/control device according to Claim 8 of the present invention, in addition to the function of the invention of any one of Claims 1 to 7, the control amount continuation determining unit determines whether or not the duration of the control amount in the same direction with respect to the same voltage and reactive power adjustment equipment has continued for a predetermined time period, and the control amount calculating unit performs the instruction output of the control amount to the voltage and reactive power adjustment equipment in a case where control amount continuation determining unit determines that the control amount has continued for the predetermined time or more. It is disclosed that this makes it possible to suppress unnecessary frequent control of the voltage and reactive power adjustment equipment in a case where the control amount does not continue for a predetermined time or more like instantaneous disturbance change of the power system".

CITATION LIST

Patent Literature

PTL 1: JP-A-8-280135
PTL 2: JP-A-7-288932
PTL 3: JP-A-2003-259554

Non-Patent Literature

Non-PTL 1: The Institute of Electrical Engineers of Japan, Voltage Stability Maintenance Measures of Electric Power System, Technical Report of The Institute of Electrical Engineers of Japan, 11-73, pp. 37 to 44 (1979) "Reactive power flow at the interconnection point approaches the reference value"

SUMMARY OF INVENTION

Technical Problem

In the future, in the power system, since a large amount of power supply (output fluctuating power supply) of which output fluctuates depending on the weather starting from renewable energy (solar power generation, wind power generation, and the like) is planned to be introduced, there is a possibility that the fluctuation amount in the voltage or the power flow becomes large. In addition, if active market transactions occur due to the liberalization of electric power, there is a concern that the line power flow increases partially or totally, and thus, the balance between the voltage and the reactive power of the power system cannot be maintained, there is a concern that the supply reliability is deteriorated, and there is a concern that the economic efficiency cannot be improved.

Regarding this point, it is disclosed that a reactive power optimum distribution calculation device of PTL 1 is configured with "a power system as a subject, a data reading device that reads a necessary data from the power system, a status estimation device that estimates a likely system status of the time point from the read data, a power system partial system division calculation device as a pre-process for performing voltage and reactive power control, a future system power flow state prediction device that predicts a future power system ahead for several hours from the status estimation device, and a reactive power distribution instruction device that issues an instruction to a manipulation equipment based on the result of the reactive power optimum distribution calculation device that selects a voltage and reactive power control device to be manipulated for optimum distribution of the reactive power from the predicted power flow state obtained from the device". Furthermore, PTL 1 discloses that "with respect to a power system as a subject, by dividing the power system and calculating a matching state between a reactive power generation source and a reactive power consumption source within the divided power system, a reactive power generation device of the power system is controlled. That is, according to the present invention, with respect to the power system as a subject, the voltage and reactive power adjustment equipment which has been collectively obtained for the entire system so far is divided into several partial systems. In the examples known so far, there has been a known example where only an electrical reactive power adjustment equipment with a high voltage sensitivity is divided into partial systems (known examples (1) (b)). However, in the present invention, the division into the partial systems is performed by setting a substation of a key system, a lower system thereof, or a system with the same power supply as one unit. In this division method, in a case where balance between demand and supply of the reactive power cannot be achieved, fusion and division with adjacent partial systems are repeated, and optimum division into the partial systems is performed. In this manner, the reactive power balance is obtained for each of the divided partial systems, and an optimum voltage and reactive power adjustment equipment is obtained for each partial system. In the calculation of the voltage and reactive power adjustment equipment to be optimally controlled for each partial system, in addition to the algorithm used in the related art, a method of searching a case of a similar system situation from past history data and selecting an optimum voltage and reactive power control device based on the past result is used. In addition, by combining this idea with a power-flow-state prediction support system for several hours ahead in the future, it is allowed to cope with momentarily-varying system condition. In addition, the result of the reactive power manipulation equipment at each time point and the power flow state are learned and are used for the calculation of the optimum reactive power control device at the next time point".

However, according to PTL 1, if an increase in partial line power flow due to active market transactions or a decrease in output ratio of existing power sources such as thermal power generators due to expanded introduction of renewable energy occurs, there is a concern that the control subject facility in each partial system is biased to either the generator or the reactive power supply device, and the supply of the reactive power is insufficient, and thus, the fusion of the above partial systems is repeated, so that there is a concern that the effect such as prevention of the reverse operation phenomenon that is expected by dividing into the above partial systems may be reduced or may not be obtained.

In Non-PTL 1, as the method of distributing the reactive power required for adjustment between the generators, as described in PTL 1, there are "(a) a method of using a determination function, (b) a method of distributing at an equal margin rate, and (C) a method of distributing with a minimum transmission loss. The method of distributing by using the determination function in (a) is to calculate the change amount of the determination function for all the adjustment equipments in the subject system, to select the adjustment equipment that allows the maximum determination function to decrease, and perform manipulation within the adjustment upper and lower limits. This process is repeated until the constraint condition of the monitoring point is satisfied. In addition, in the method (b), with respect to the deviation of the reference voltage of the voltage monitoring equipment in the power system, groups of the generators for adjusting the deviation are allowed to be associated with system characteristic constants in advance, and the adjustment amount is obtained so that the units within each group have the same margin rate within the determined reactive power adjustment range. In addition, the method of distributing with the minimum transmission loss in (c) is to reduce the average value of the deviation from the reference value of the voltage at various locations of the system and control the total value of the reactive power of the thermal power so that the reactive power flow at the interconnection point approaches the reference value".

However, according to Non-PTL 1, if an increase in partial line power flow due to active market transactions or a decrease in output ratio of existing power sources such as thermal power generators due to expanded introduction of renewable energy occurs, there is a concern that the control subject facility may be biased to either the generator or the reactive power supply device. In Non-PTL 1, as illustrated in Table 5.1, the thermal power, the hydraulic power, the LRT, the SC, and the ShR are described as the adjustment equipments, but only the method of distributing the reactive power required for adjustment between the generators is not described, and the method of distributing to the reactive power supply device and the distributing method combining the generator and reactive power supply device are not described. For this reason, there is a concern that it is difficult to distribute the reactive power to the reactive power supply devices or to the generator and the reactive power supply device, and the balance between the voltage and the reactive power of the power system cannot be maintained, there is a concern that the supply reliability is deteriorated, and there is a concern that the economic efficiency cannot be improved.

According to PTL 2, "even though the control applicability of the control equipment, the bus voltage upper and lower limits of the monitoring point, and the reactive power flow upper and lower limits of the transmission line can be considered in the above-described method based on the sensitivity constant in the related art, the cooperative control between the control equipments is inadequate for the following reasons. (a) First problem: Unbalance of control amount distribution between generators. Since the sensitivity constants $A_{ij}$, $B_{kj}$, and $D_{kj}$ used in Formulas (5) and (6) are calculated by using the DC equivalent circuit of the power system or the Jacobian matrix of the power equation, the generator with the a larger effect amount is exclusively controlled with a slight difference in impedance of the step-up transformer and the transmission line between the generation equipments in the generator and between the generation equipment of the adjacent generator. As a result, the unbalance of the reactive power output leads to over-excitation of the generators and occurrence of phase advance operation, which leads to a decrease in reliability especially in terms of stability in system operation. In a case where control is performed by voltage target value control for a generator during the operating in an automatic voltage regulation (AVR) mode, the unbalance of the reactive power output is easily noticeable. (b) Second problem: Unbalance of reactive power output between reactive power supply device and generator. In the operation of the power system, the reactive power output of the generator and the reactive power output of the reactive power supply device need to cooperate as described below. In order to prevent excessive excitation or phase advance operation of the generator, it is necessary to secure operating margin. In a case where the reactive power required by the system is changed significantly, in order to maintain the operating margin of the generator, the reactive power supply device adjusts the reactive power supply amount. On the other hand, in the reactive power supply device, the reactive power supply amount is adjusted by opening and closing control of the power condenser and the reactor, and it is necessary to avoid frequent opening and closing manipulation. Therefore, in a case where the system status is stable and the change in the required reactive power amount is small, the control by the generator is prioritized. In the method based on the sensitivity constant, the control priority is determined by the effect amount, but since the predetermined constants $\alpha j$ and $\beta j$ are used in Formulas (5) and (6), it is difficult to perform the cooperative control in response to the momentarily changing system status. (c) Third Problem: Control cooperation between "LRT and reactive power supply device" and "generators" is not possible. In the LRT control, a method is often adopted to determine raising/lowering the tap from the primary side voltage (V1) and the secondary side voltage (V2) of the transformer equipped with the LRT. In addition, since the reactive power supply device is often installed on the tertiary side of the transformer, in order to cooperate with the reactive power supply device, the LRT control defines the operation areas on the plane represented by the deviations $\Delta V1$ (=V1−V1ref) and $\Delta V2$ (=V2−V2ref) from the control subject voltages V1ref and V2ref (in some cases, the deviation $\Delta Q$ of secondary side reactive power flow of the transformer may be used instead of $\Delta V2$). In the operation area, in general, the LRT control is set when the signs of $\Delta V1$ and $\Delta V2$ are opposite to each other, and the control of the reactive power supply device is set when the signs are the same as each other. In addition, on the plane, as usual, a control dead zone is provided around the origin for the purpose of preventing hunting of the control and preventing excessively frequent control. Although the control cooperation between the LRT and the reactive power supply device is realized in the above-described method, since only the voltage across the transformer is used for the control amount determination, it is impossible to cooperate with the entire power system, especially with the generator control. The present invention has been made in view of the above circumstances, and an object thereof is to provide a cooperative control method in voltage and reactive power control having a generator, a reactive power supply device, and an LRT that do not cause unbalance in control amount distribution described above", and as a unit for solving the problem, "a cooperative control method in voltage and reactive power control according to the present invention (Claim 1) is configured with a unit for calculating an index indicating a control effect of a generator and a reactive power supply device with respect to a reactive power flow of a monitoring subject bus voltage and a monitoring subject transmission line in the voltage and reactive power control of the power system, a unit for calculating a control weighting coefficient of the generator according to the power system state in order to introduce constraint conditions for system operation among the control weighting coefficients of the respective control devices indicating the control priority, and a unit for calculating the reactive power control amounts of the generator and the reactive power supply device by using the index representing the adjustment effect and the control weighting coefficient. A cooperative control method in voltage and reactive power control according to the present invention (Claim 1) is configured with a unit for calculating an index indicating a control effect of a generator and a reactive power supply device with respect to a reactive power flow of a monitoring subject bus voltage and a monitoring subject transmission line in the voltage and reactive power control of the power system, a unit for calculating a control weighting coefficient of the reactive power supply device according to the power system state in order to introduce constraint conditions for system operation among the control weighting coefficients of the respective control devices indicating the control priority, and a unit for calculating the reactive power control amounts of the generator and the reactive power supply device by using the index representing the adjustment effect and the control weighting coefficient. A cooperative control method in the voltage and reactive power control according to Claim 3 of the present invention is configured with a unit for calculating an index indicating a control effect of a generator, a reactive power supply device, and a transformer-loaded tap switching device with respect to a reactive power flow of a monitoring subject bus voltage and a monitoring subject transmission line in the voltage and reactive power control of the power system, a unit for calculating a control weighting coefficient of the reactive power supply device and the transformer-loaded tap switching device (hereinafter, abbreviated as an LRT) according to the power system state in order to introduce constraint conditions for system operation among the control weighting coefficients of the respective control devices indicating the control priority, and a unit for calculating the reactive power control amount of the reactive power supply device and the tap manipulation amount of the LRT by using the index representing the adjustment effect and the control weighting coefficient". Herein, it is disclosed that, in the cooperative control method in the voltage and reactive power control according to Claim 3 of the present invention, "the control of the LRT and the reactive power supply device can be controlled by applying the generator control and the control cooperation of the reactive power supply device by shifting $\Delta V0$". Therefore, it is disclosed that "it is effective in equalizing the reactive power output distribution among the generators and realizing the control of the reactive power supply device that maintains the control margin of the generator between the generator and the reactive power supply device and the control of the LRT and the reactive power supply device which does not conflict with the above control, that is, the cooperative control between the control devices".

However, according to PTL 2, if an increase in partial line power flow due to active market transactions or a decrease in output ratio of existing power sources such as thermal power generators due to expanded introduction of renewable energy occurs, since the insufficiency of the reactive power supply in the system is biased or the fluctuation period of demand and voltage is also changed, so that there is a concern that the above effect may be reduced in the cooperative control method.

In PTL 3, it is disclosed that "in the voltage and reactive power monitoring/control device according to Claim 8 of the present invention, in addition to the function of the invention of any one of Claims 1 to 7, the control amount continuation determining unit determines whether or not the duration of the control amount in the same direction with respect to the same voltage and reactive power adjustment equipment has continued for a predetermined time period, and the control amount calculating unit performs the instruction output of the control amount to the voltage and reactive power adjustment equipment in a case where control amount continuation determining unit determines that the control amount has continued for the predetermined time or more.
With such a configuration, it is possible to suppress useless frequent control of the voltage and reactive power adjustment equipment in a case where the control amount does not continue for a predetermined time or more like a change of an instantaneous external disturbance of the power system".

However, according to PTL 3, if an increase in partial line power flow due to active market transactions or a decrease in output ratio of existing power sources such as thermal power generators due to expanded introduction of renewable energy occurs, since the insufficiency of the reactive power supply in the system is biased, there is a concern that, merely by considering the influence of the change of the external disturbance, it is difficult to distribute the reactive power to the reactive power supply device or to the generator and the reactive power supply device, and the balance between the voltage and the reactive power of the power system cannot be maintained, there is a concern that the supply reliability is deteriorated, and there is a concern that the economic efficiency cannot be improved.

In PTL 3, "in FIG. 15, the frequent control suppression order designation unit 25 selects the suppression order of the control frequency of the voltage and reactive power adjustment equipment with respect to the calculation by the LP-method optimum calculation unit 24 added with frequent control suppression. For example, in the sixth embodiment, control is performed fixedly in the order of control of the generator, control with addition of a load-tapped transformer LRT, and control with addition of a phase-shifting equipment (power condenser, shunt reactor). However, this order is selected by the frequent control suppression order designating unit 25. FIG. 16 is a flowchart illustrating the process contents of an LP-method optimum calculating unit 24 with frequent control suppression in the seventh embodiment. First, an order designation data from the frequent control suppression order designating unit 25 is acquired (S60), and the combined distribution designation among the phase-shifting equipment, the LRT, and the generator is determined, and the distribution designation is performed (S61). That is, according to the distribution designation in step S61, condition setting by each distribution designation is performed (S62 to S68). That is, in the case of the distribution designation of only the generator, the condition setting with the generator as the control subject is performed (S2); in the case of the distribution designation of only the phase-shifting equipment (power condenser and shunt reactor), the condition setting with the phase-shifting equipment (power condenser and shunt reactor) as the control subject is performed (S63); in the case of the distribution designation of only the load-tapped transformer LRT, the condition setting with the load-tapped transformer LRT as the control subject is performed (S64); In the case of the distribution designation of the generator and the phase-shifting equipment, the condition setting with the generator and the phase-shifting equipment as the control subjects is performed (S65); in the case of the distribution designation of the generator and the load-tapped transformer LRT, the condition setting with the generator and the load-tapped transformer LRT as the control subjects is performed (S66); in the case of the distribution designation of the phase-shifting equipment and the load-tapped transformer LRT, the condition setting with the phase-shifting equipment and the load-tapped transformer LRT as the control subjects is performed (S67); and in the case of the distribution designation of all the voltage and reactive power adjustment equipments, the condition setting with all the voltage and reactive power adjustment equipments as the control subjects is performed (S68)".

However, according to PTL 3, it is not described how the order designation data or the distribution designation is specifically set, and the frequent control suppression order designating unit is not clear. Therefore, there is a concern that the reactive power distribution to the reactive power supply y device or the generator and the reactive power supply device is unclear, and the balance between the voltage and the reactive power of the power system cannot be maintained, there is a concern that the supply reliability is deteriorated, and there is a concern that the economic efficiency cannot be improved.

Therefore, the present invention is to provide voltage and reactive power monitoring/control device and method applied to a power system capable of maintaining balance between a voltage and a reactive power of the power system and improving economic efficiency even though output fluctuation of renewable energy or a change of a configuration or number of power sources, a configuration of a reactive power supply device, or a system configuration occurs due to the weather along with the elapse of time.

Solution to Problem

In order to solve the above problem, for example, the configurations described in the claims are adopted.

The present invention includes a plurality of units for solving the above-described problems. As an example, there is a voltage and reactive power monitoring/control device which is applied to a power system including a control subject equipment capable of adjusting a reactive power, and which monitors and controls a voltage and the reactive power, including: a fluctuation component calculation unit calculating a fluctuation component of a predicted value of data obtained from the power system; a required reactive power amount calculation unit obtaining the reactive power required for suppressing the fluctuation component as a required reactive power amount; a reactive power distribution subject selection unit selecting a reactive power distribution subject among a plurality of control subject equipments; an output distribution calculation unit performing output distribution calculation of the required reactive power amount for the selected control subject equipment; and an output instruction unit calculating a control instruction value for each control subject equipment from an output distribution calculation result determined for the selected control subject equipment.

In addition, according to the present invention, there is provided a voltage and reactive power monitoring/control device which is applied to a power system including a control subject equipment capable of adjusting a reactive power, and which monitors and controls a voltage and the reactive power, including: a status estimation calculation unit calculating a system status at a time of power system measurement by using a measurement data of the power system and data of a system facility of the power system to obtain a status estimation calculation result; a predicted value calculation unit predicting a future system status from the time of power system measurement by using data of the status estimation calculation result and a prediction data of power generation and load of the power system to obtain a predicted value; a fluctuation component calculation unit calculating a fluctuation component of a predicted value of data obtained from the power system; a required reactive power amount calculation unit obtaining the reactive power required for suppressing the fluctuation component as a required reactive power amount; a reactive power distribution subject selection unit selecting a reactive power distribution subject among a plurality of control subject equipments; an output distribution calculation unit performing output distribution calculation of the required reactive power amount for the selected control subject equipment; and an output instruction unit calculating a control instruction value for each control subject equipment from an output distribution calculation result determined for the selected control subject equipment.

In addition, according to the present invention, there is provided a voltage and reactive power monitoring/control method which is applied to a power system including a control subject equipment capable of adjusting a reactive power, and which monitors and controls a voltage and the reactive power, including calculating a system status at a time of power system measurement by using a measurement data of the power system and data of a system facility of the power system; performing prediction calculation of a future system status from a time of power system measurement by using data of a state estimation calculation result and a prediction data of power generation and load of the power system; obtaining a fluctuation component of a predicted value of data obtained from the power system, obtaining the reactive power required for suppressing the fluctuation component as a required reactive power amount, and selecting a reactive power distribution subject among a plurality of control subject equipments; performing output distribution calculation of the required reactive power amount for the selected control subject equipment; and calculating a control instruction value for each control subject equipment from an output distribution calculation result determined for the selected control subject equipment.

Advantageous Effects of Invention

According to the present invention, even though the output fluctuation of the renewable energy or the change of the power source configuration or the system configuration occurs due to the weather along with the elapse of time, it is possible to maintain the balance between the voltage and the reactive power of the power system, and it is possible to improve economic efficiency.

In addition, according to the embodiment of the present invention, it is possible to reduce the labor for weighting when using a plurality of objective functions in calculating the target value and the control amount of the power system voltage and reactive power monitoring/control device.

BRIEF DESCRIPTION OF DRAWINGS

FIG. 1 is a diagram in which a voltage and reactive power monitoring/control device 10 according to a first embodiment is described by processing functions therein.

FIG. 2 is a diagram illustrating an overall configuration example of a power system and a hardware configuration of the voltage and reactive power monitoring/control device according to the first embodiment of the present invention.

FIG. 3 is a diagram illustrating various programs stored in a program database DB15.

FIG. 4 is a diagram illustrating an example of a predicted value data D1 stored in a predicted value database DB1.

FIG. 5 is a diagram illustrating an example of a distribution necessity determination reference data D2 stored in a distribution necessity determination reference database DB2.

FIG. 6 is a diagram illustrating an example of a control subject current output value data D3 stored in a control subject current output value database DB3.

FIG. 7 is a diagram illustrating an example of a control subject output upper-lower limit value/increment value data D4 stored in the control subject output upper-lower limit value/increment value database DB4.

FIG. 8 is a diagram illustrating an example of a flowchart illustrating the entire processes of the voltage and reactive power monitoring/control device 10 according to the first embodiment.

FIG. 9 is a diagram illustrating an example of a process of calculating a required reactive power.

FIG. 10 is a diagram illustrating an example of a process of calculating output distribution.

FIG. 11 is a diagram illustrating an example of a screen displaying manipulation frequency and the number of times of use for checking a voltage state and an output distribution effect.

FIG. 12 is a diagram in which a voltage and reactive power monitoring/control device 10 according to a second embodiment is described by processing functions therein.

FIG. 13 is a diagram illustrating an overall configuration example of a power system and a hardware configuration of the voltage and reactive power monitoring/control device according to the second embodiment of the present invention.

FIG. 14 is a diagram illustrating various programs stored in a program database DB15.

FIG. 15 is a diagram illustrating an example of a flowchart illustrating the entire processes of the voltage and reactive power monitoring/control device 10 according to the second embodiment.

FIG. 16 is a diagram illustrating an example of a screen displaying a trend display of required reactive power, future prediction, current/past reactive power equipment capacity, and future required equipment capacity.

DESCRIPTION OF EMBODIMENTS

Hereinafter, embodiments of the present invention will be described in detail with reference to the drawings.

Since the embodiments of the present invention include various modes, an overview of each embodiment will be described before starting the detailed description.

Each of the embodiments of the present invention is configured with a central device that performs monitoring and controlling a power system and further an individual control device that is installed at an individual location of the power system to operate according to a transmission data from the central device.

It is considered that the central device in the first embodiment which is described with reference to FIGS. 1 to 11 is intended to, for example, be installed in a local power supply instruction station for monitoring and controlling in an area where the power system is divided into plural parts to perform intra-area control.

It is considered that the central device in the second embodiment which is described with reference to FIGS. 12 to 15 cooperates with a central power supply instruction station which performs monitoring and controlling the power system as a whole or is installed in the central power supply instruction station to perform intra-area control.

In a third embodiment, a modified alternative example of a control evaluation unit in the first or second embodiment is illustrated.

First Embodiment

In the first embodiment, for example, a system configuration including a central device that is installed at a local power supply instruction station for monitoring and controlling in an area where a power system is divided into a plural parts to perform monitoring and controlling the power system, and further an individual control device that is installed at an individual location of the power system to operate according to a transmission data from the central device will be described.

FIG. 2 is a diagram illustrating an overall configuration example of the power system and a hardware configuration of the voltage and reactive power monitoring/control device 20 according to the first embodiment of the present invention. In this figure, a configuration example of the power system 100 and a hardware configuration example of the voltage and reactive power monitoring/control device 10 are described. First, the configuration example of the power system 100 will be described, and after that, the hardware configuration example of the voltage and reactive power monitoring/control device will be described.

The power system 100 that is indicated as 100 and illustrated in FIG. 2 mainly illustrates the power transmission system portion, but in the first embodiment of the present invention, this range corresponds to the area where the power system is divided into plural parts. In addition, the voltage and reactive power monitoring/control device 10 corresponds to the central device that is installed at the local power supply instruction station for monitoring and controlling in the area where the power system is divided into plural parts to perform monitoring and controlling the power system. In addition, in a broad sense, the power system is a concept including a power generation system and a load system in addition to the range indicated as 100. In the following description, the power system is used in a broad sense unless particularly necessary.

The power system is configured with power supplies 110 (110a and 110b), nodes (buses) 120 (120a, 120b, 120c, 120d, 120e, 120f, 120h, 120i, and 120j), transformers 130 (130a, 130b, 130c, 130d, and 130e), branches (lines) 140 (140b, 140e, 140f, 140g, and 140h), loads 150 (150a 150b, and 150c) and the like as major main circuit constituent equipment, and disposes power condensers (SC: static condenser) 160 (160a, 160b, 160c, and 160d) and shunt reactors (ShR) 170 (170a and 170b) as equipment for power adjustment at appropriate individual locations.

In addition, the transformers 130c and 130e are tapped transformers 131, and power condenser 160b and shunt reactors 170a and 170b are connected to the tertiary windings, respectively. Although not illustrated in FIG. 2, the transformers 130c and 130e are configured with any one or a plurality of pieces of other controllable equipments (battery, rechargeable secondary battery, EV storage battery, flywheel, other phase modifying equipment (static reactive power compensation device SVC (Static Var Compensator), static reactive power generation device SVG (Static C Var Generator), transformer with phase adjuster LPC (Loop Power Controller), and the like).

In order to control a power system configured with a plurality of these various pieces of equipment, various measurement devices 44 are arranged at appropriate individual locations according to respective purposes at various locations of the power system. In addition, with respect to the controllable equipment among the plurality of these various pieces of equipment, the individual control devices 45 (45a, 45b) for controlling these pieces of equipment are arranged at appropriate individual locations according to the respective purposes.

Among the above-described various pieces of equipments and the like, contents, structures, characteristics, and the like of equipment deeply related to the present invention are described below.

First, the power source 110 includes a distributed type power source such as solar power generation or wind power generation, an inverter interconnection power source connected to the power system via an inverter, and the like besides a rotary type power source such as a thermal power generator, a hydraulic power generator, and a nuclear power generator.

The measurement device 44 is a device that measures any one or a plurality of the node voltage V, the branch current I, the active power P, the reactive power Q, the power factor $\phi$, the tap value, on/off information of a switch of a node, a branch, a transformer, a power condenser, a shunt reactor and the like, and the like. This is, for example, a meter transformer VT (Voltage Transformer), a meter transformer PT (Potential Transformer), and a meter current transformer CT (Current Transformer), and is Telemeter (TM) or Super Vision SV which has the function of transmitting data including a data measurement location identification ID or a built-in time stamp of the measurement device. In addition, a device, a phase measurement device (phasor measurement unit (PMU), or other measurement instrument that measures power information (phasor information of voltage) attached with absolute time using GPS may be used. The measurement device 44 is described as being in the power system 100 but may be installed on a bus or a line connected to the power source 110, the transformer 130, the tapped transformer 131, the load 150, the power condenser 160, the shunt reactor 170, the measurement device 44, and the individual control device 45.

The power system of FIG. 2 is generally as described above. In this regard, the voltage and reactive power monitoring/control device 10 according to the first embodiment of the present invention inputs the reception data 71 from the measurement device 44 of the power system 100 via the communication network 300 and transmits the transmission data 72 to the individual control device 45. In this case, although the data content of the reception data 71 may include other data, basically the data content is the reference bus measurement value data D5. It is intended to achieve the function of the voltage and reactive power monitoring/control device 10 installed in, for example, a local power supply station based on the data measured at the bus defined as the reference bus among the buses in the power system 100.

More specifically, herein, the reference bus measurement value data D5 which is the data content of the reception data 71 is any one or a plurality of data of the node voltage V, the branch current I, the power factor $\phi$, the active power P, and the reactive power Q measured by the measurement device 44, is received by the voltage and reactive power monitoring/control device 10 via the communication network 300, and is stored in the internal reference bus measurement value database DB5. However, instead of directly receiving the reference bus measurement value data D5 from the measurement device 44, the reference bus measurement value data D5 may be collected at once by other monitoring devices, and after that, may be stored in the reference bus measurement value database DB5 via the communication network 300. Alternatively, the reference bus measurement value data D5 may be stored in the reference bus measurement value database DB5 from the measurement device 44 or other monitoring devices via the communication network 300. In addition, the reference bus measurement value data D5 may include a unique number for identifying data and a time stamp. In addition, the other monitoring devices are, for example, a central power supply instruction station, a system stability monitoring server, and the like.

The hardware configuration of the voltage and reactive power monitoring/control device 10 in FIG. 2 is as follows. Since the voltage and reactive power monitoring/control device 10 is generally configured with a computer device, the voltage and reactive power monitoring/control device 10 is configured with a display unit 11, an input unit 12 such as a keyboard and a mouse, a communication unit 13, a computer or a computing server (CPU: Central Processing Unit) 14, a memory 15, and various databases DB. These are connected to each other by a bus line 43.

Among these components, the display unit 11 is configured as, for example, a display device, but a configuration using a printer device, a sound output device, or the like instead of or in addition to the display device may be used.

The input unit 12 can be configured with at least one of a keyboard switch, a pointing device such as a mouse, a touch panel, a voice instruction device, and the like.

The communication unit 13 includes a circuit and a communication protocol for connecting to the communication network 300.

The CPU 14 reads and executes a predetermined computer program from the program database DB15. The CPU 14 may be configured with one or a plurality of semiconductor chips or may be configured as a computer device such as a calculation server.

The memory 15 is configured as, for example, a RAM (Random Access Memory) to store the computer program read from the program database DB15 or to store calculation result data, image data, and the like required for each process. The screen data stored in the memory 14 is transmitted to the display unit 11 to be displayed. An example of the screen to be displayed will be described later.

More specifically, the various databases DB are as follows. The database DB is configured with a predicted value database DB1 that stores a predicted value data D1, an distribution necessity determination reference database DB2 that stores a distribution necessity determination reference data D2, a control subject current output value database DB3 that stores a control subject current output value D3, a control subject output upper-lower limit value/increment value database DB4 that stores a control subject output upper-lower limit value/increment value data D4, a reference bus measurement value database DB5 that stores a reference bus measurement value data D5, a reference bus target value database DB6 that stores a reference bus target value data D6, a control subject sensitivity database DB7 that stores a control subject sensitivity data D7, a conversion coefficient database DB8 that stores a conversion coefficient data D8, a control subject changeable period database DB9 that stores a control subject changeable period data D9, a required reactive power calculation result database DB10 that stores a required reactive power calculation result data D10, a reactive power distribution subject selection result database DB11 that stores a reactive power distribution subject selection result data D11, an output distribution calculation result database DB12 that stores an output distribution calculation result data D12, a control instruction value calculation result database DB13 that stores a control instruction value calculation result data D13, a control evaluation result database DB14 that stores a control evaluation result data D14, a program database DB15 that stores a program D15, and a fluctuation component calculation result database DB16 that stores a fluctuation component calculation result data D16.

In addition, among the data stored in these databases, a system measurement data may be collected through other monitoring/control devices or may be input from various measurement devices. In addition, a data related to system facilities can be received manually or received from the central power supply instruction station or the like. In addition, each data may be data that has been set in advance and stored in a database. In addition, data exchange via the bus line 43 is performed with respect to the data including data of an instruction value, a time, and ID.

FIG. 2 illustrates the hardware configuration of the voltage and reactive power monitoring/control device 10, whereas FIG. 1 describes the voltage and reactive power monitoring/control device 10 with processing functions therein.

The processing functions of FIG. 1 are configured by a series of processing units in the calculation unit 41, and shown as process steps in which the data of the result system database DBO are formed from the data of the input system database DBI by a series of processes in the calculation unit 41. Herein, the databases DB1 to DB14, and DB16 illustrated in FIG. 2 are positioned in either the input system database DBI or the result system database DBO.

In the input system database DBI, the predicted value database DB1, the distribution necessity determination reference database DB2, the control subject current output value database DB3, the control subject output upper-lower limit value/increment value database DB4, the reference bus measurement value database DB5, the reference bus target value database DB6, the control subject sensitivity database DB7, the conversion coefficient database DB8, and the control subject changeable period database DB9 are positioned.

In the result system database DBO, the required reactive power calculation result database DB10, the reactive power distribution subject selection result database DB11, the output distribution calculation result database DB12, the control instruction value calculation result database DB13, the control evaluation result database DB14, and the fluctuation component calculation result database DB16 are positioned.

The calculation unit 41 is configured with a fluctuation component calculation unit 31, a required reactive power calculation unit 32, a reactive power distribution subject selection unit 33, an output distribution calculation unit 34, a control instruction value calculation unit 35, an output instruction unit 36, and a control evaluation unit 37.

According to a series of processes of the calculation unit 41, the fluctuation component calculation unit 31 calculates a fluctuation component by using the predicted value data D1 which is the predicted value of the power system information and stores the calculated fluctuation component calculation result data D16 in the fluctuation component calculation result database DB16.

The required reactive power calculation unit 32 calculates the required reactive power by using the conversion coefficient data D8 of the conversion coefficient database DB8 and the fluctuation component calculation result data D16 calculated by the fluctuation component calculation unit 31 and stores as the required reactive power calculation result data D10 in the required reactive power calculation result database DB10.

The reactive power distribution subject selection unit 33 selects the reactive power distribution subject by using the control subject changeable period data D9 of the control subject changeable period database DB9, the fluctuation component calculation result data D16 calculated by the required reactive power calculation unit 32, the distribution necessity determination reference data D2 stored in the distribution necessity determination reference database DB2, the control subject current output value data D3 stored in the control subject current output value database DB3, and the control subject output upper-lower limit value/increment value data D4 stored in the control subject output upper-lower limit value/increment value database DB4. The selected reactive power distribution subject selection result is accumulated as the reactive power distribution subject selection result data D11 in the reactive power distribution subject selection result database DB11.

The output distribution calculation unit 34 calculates the output distribution by using the control subject current output value data D3 stored in the control subject current output value database DB3, the control subject output upper-lower limit value/increment value data D4 stored in the control subject output upper-lower limit value/increment value database DB4, the reference bus measurement value data D5 stored in the reference bus measurement value database DB5, the reference bus target value data D6 stored in the reference bus target value database DB6, the control subject sensitivity data D7 stored in the control subject sensitivity database DB7, the calculated required reactive power calculation result data D10, and the calculated reactive power distribution subject selection result data D11 and stores as the output distribution as the output distribution calculation result data D12 in the output distribution calculation result database DB12.

The control instruction value calculation unit 35 calculates the control instruction value by using the reference bus measurement value data D5 stored in the reference bus measurement value database DB5, the reference bus target value data D6 stored in the reference bus target value database DB6, the control subject sensitivity data D7 stored in the control subject sensitivity database DB7, and the calculated output distribution calculation result data D12 and stores as the control instruction value calculation result data D13 in the control instruction value calculation result database DB13.

The output instruction unit 36 instructs to output the calculated control instruction value calculation result data D13.

The control evaluation unit 37 evaluates control by using the calculated fluctuation component calculation result data D16, the calculated required reactive power calculation result data D10, the reactive power distribution subject selection result data D11, the output distribution calculation result data D12, and the control instruction value calculation result data D13. The evaluation result is accumulated as control evaluation result data D14 in the control evaluation result database DB14.

In addition, in the display unit, various data accumulated in the databases DB is displayed in an appropriate format either alone or while illustrating correlation. For example, one or more of the predicted value data D1, the distribution necessity determination reference data D2, the control subject current output value data D3, the control subject output upper-lower limit value/increment value data D4, the reference bus measurement value data D5, the reference bus target value data D6, control subject sensitivity data D7, the calculated required reactive power calculation result data D10, the reactive power distribution subject selection result data D11, the output distribution calculation result data D12, the control instruction value calculation result data D13, and the control evaluation result data D14 is displayed.

Simply describing the series of processes of the calculation unit 41 described above, it can be said that it is possible to obtain the fluctuation component from the predicted state of the power system, to determine the required reactive power required for suppressing the fluctuation component, and to determine the control subject equipment which can supply the required reactive power and the control amount thereof. In the following description, a method for realizing these series of processes will be described in detail.

FIG. 3 exemplifies various programs stored in the program database DB15. The program database DB15 stores, for example, a fluctuation component calculation program P31 for realizing function of the fluctuation component calculation unit 31, a required reactive power calculation program P32 for realizing functions of the required reactive power calculation unit 32, a reactive power distribution subject selection program P33 for realizing functions of the reactive power distribution subject selection unit 33, an output distribution calculation program P34 for realizing functions of the output distribution calculation unit 34, a control instruction value calculation program P35 for realizing functions of the control instruction value calculation unit 35, an output instruction program P36 for realizing functions of the output instruction unit 36, a control evaluation program P37 for realizing functions of the control evaluation unit 37, and a screen display program P11 for realizing functions of the display unit 11.

Returning to FIG. 2, the CPU 14 executes calculation programs (the fluctuation component calculation program P31, the required reactive power calculation program P32, the reactive power distribution subject selection program P33, the output distribution calculation program P34, the control instruction value calculation program P35, the output instruction program P36, the control evaluation program P37, and the screen display program P11) read from the program database DB15 to the memory 14 to perform the fluctuation component calculation, the required reactive power calculation, the reactive power distribution subject selection, the output distribution calculation, the control instruction value calculation, the output instruction, the control evaluation, the display of various screens, the instruction of an image data to be displayed, the searching for data in various databases, and the like.

The memory 14 is a memory for temporarily storing the image data for display, the reference bus measurement value data D5, or each calculated temporary data and each calculation result data, and the CPU 14 generates necessary image data and displays the image data on the display unit 11 (for example, display screen). In addition, the display unit 11 of the voltage and reactive power monitoring/control device 10 may be a simple screen only for rewriting each of the control programs and the databases.

A plurality of the databases DB are stored in the voltage and reactive power monitoring/control device 10 of the power system. With respect to the other databases DB (DB1 to DB14 and DB16) excluding the program database DB, the contents of data treated herein will be described more in detail.

FIG. 4 illustrates an example of the predicted value data D1 stored in the predicted value database DB1. The data of the voltage V, the active power P, the reactive power Q, and the like of each node obtained by the power flow calculation using a power generation plan, a load demand prediction value, and the like are stored as time-series data as the predicted value data D1 in the predicted value database DB1 of FIG. 4. The predicted value data D1 may be acquired by calculation or storage in a separate system such as a monitoring/control device, a central power supply instruction station, or an EMS, may be manually input, or may be calculated with a configuration of a second embodiment described later. In manually inputting, the data is manually input and stored by the input unit 12. In addition, in inputting, necessary image data may be generated and displayed on the display unit 11 by the CPU 14. In inputting, the inputting may be semi-manually performed so that a large amount of data can be set by using a complementary function.

FIG. 5 illustrates an example of the distribution necessity determination reference data D2 stored in the distribution necessity determination reference database DB2. A reference for determining distribution necessity for each fluctuation (fluctuation 1, fluctuation 2, and fluctuation 3) as illustrated in FIG. 5 is stored as distribution necessity determination reference data D2 in the distribution necessity determination reference database DB2. In addition, the distribution necessity determination reference data D2 may be set remotely from the monitoring/control device, the central power supply instruction station, or the EMS or may be manually input. In manually inputting, the data is manually input and stored by the input unit 12. In addition, in inputting, necessary image data may be generated by the CPU 14 and may be displayed on the display unit 11. In inputting, the inputting may be semi-manually performed so that a large amount of data can be set by using a complementary function.

Describing the distribution necessity determination reference database DB2 more in detail, references for determining distribution necessity for, for example, a short-period fluctuation, a medium-period fluctuation, and a long-period fluctuation are described as the distribution necessity determination reference data D2. Herein, reference values of the distribution necessity determination reference data D2 are set for, for example, reactive powers $\Delta Q1$, $\Delta Q2$, and $\Delta Q3$ required for suppressing these fluctuations. The reference values are set in advance. However, for example, with respect to the reactive power that can be changed to both plus and minus with a constant load fluctuation, if the control is performed to sequentially correspond thereto, unnecessary control is performed. Therefore, a reference value that can be determined to exceed such a fluctuation is set. The reference values of such fluctuation data may be corrected by the operator by accumulating the system data or may be automatically corrected.

FIG. 6 illustrates an example of the control subject current output value data D3 stored in the control subject current output value database DB3. The active power P and the reactive power Q of the generator and the reactive power sharing device to be controlled as illustrated in FIG. 6 are stored for each time as the control subject current output value data D3 in the control subject current output value database DB3.

FIG. 7 illustrates an example of the control subject output upper-lower limit value/increment value data D4 stored in the control subject output upper-lower limit value/increment value database DB4. In the control subject output upper-lower limit value/increment value database DB4, as the control subject output upper-lower limit value/increment value data D4, as illustrated in FIG. 7, any one or plural ones of an upper limit value, a lower limit value, and an increment value for each generator and reactive power supply device are configured and stored. These data may be stored by using the input unit 12 of the voltage and reactive power monitoring/control device 10 or may be stored from other monitoring devices.

The reference bus measurement value database DB5 includes the measurement time and the measured value, for example, the voltage V as the reference bus measurement value data D5. For example, one or a plurality of a voltage of the node 120 connected to the power system 100, a voltage V of the node 120 connected to the transformer 130, a voltage V of the power source 110 connected to the node 120, a voltage V of the load 150, voltages V of other nodes, branches, power sources, loads, control devices, and the like connected to the power system 100 that are measured in the measurement device 44 and other monitoring devices through a communication network are stored. In addition, the measurement device is a VT or the like. The reference bus measurement value data D5 may be obtained from the monitoring/control device, the central power supply instruction station, or the EMS or may be directly obtained from the measurement device of the entire system.

The target value at each time is stored as the reference bus target value data D6 in the reference bus target value database DB6. If a target value is set in a schedule, the target value is stored every period in which the schedule is set. In addition, the value may be set and stored remotely from the monitoring/control device, the central power supply instruction station, or the EMS or may be manually set. Herein, the reference bus target value is assumed to be calculated and stored in advance in accordance with a method or the like disclosed in "Voltage Stability Maintenance Measures of the Electric Power System, in Technical Report 11-73 of the Institute of Electrical Engineers of Japan, pp. 10-14 (1979)".

In the control subject sensitivity database DB7, as the control subject sensitivity data D7, a numerical value indicating how much the change in output of a certain control subject exerts on the bus is stored, and a sensitivity regarding the voltage V and the reactive power Q is stored. These data may be set remotely from the monitoring/control device, the central power supply instruction station, and EMS or may be manually set. In addition, by taking into consideration that the sensitivity varies every moment, these data may be sequentially calculated and stored by the following method.

In addition, the above-described control subject sensitivity is a sensitivity matrix and is calculated and stored in advance or sequentially in accordance with a method or the like disclosed in a document by Yokoyama, "Uniform sensitivity coefficient determination method for power system analysis and control", Journal of the Institute of Electrical Engineers of Japan, B, Vol. 94, No. 1, pp. 17 to 24 (1974), a document by CONEJO, A., GOMEZ, T., and DE LA FUENTE, J. I., "Pilot-Bus Selection for Secondary Voltage Control", Eur. Trans. Electr. Power Eng., 1993, 3, (5), pp. 359-366. By using the above-described methods, there is an advantage that the sensitivity matrix can be obtained by a partial modification of the power flow calculation using the Newton-Raphson method which is often used in the related art.

With respect to the fluctuations of the power system, the conversion coefficient database DB8 stores conversion coefficients for determining the reactive power required for suppressing these fluctuations. For example, in a case where the fluctuation is a fluctuation in the voltage of the power system, a coefficient for converting to the reactive power required for suppressing this voltage fluctuation is stored as a conversion coefficient. It is preferable that the conversion coefficients are prepared for various types of fluctuations and are prepared for each fluctuation period even though the fluctuation is of the same type.

The control subject changeable period database DB9 stores response characteristics, adjustment power, and the like for each controllable equipment arranged in the power system. For example, the control subject changeable period database DB9 stores information indicating that coping with the fluctuations in a short period is not appropriate due to a mechanical structure but suppressing the fluctuations in a long period is appropriate, information indicating that suppressing the fluctuations in a short period is appropriate due to the configuration with power elements but an adjustment power is limited due to the included capacitor.

The required reactive power for each fluctuation obtained from the prediction time-series average voltage fluctuation as illustrated in FIG. 9 is stored as the required reactive power calculation result data D10 in the required reactive power calculation result database DB10. Details of FIG. 9 will be described later.

The selection result of the reactive power distribution subject determined by using the required reactive power calculation result data D10 and the distribution necessity determination reference data D2 is stored as the reactive power distribution subject selection result data D11 in the reactive power distribution subject selection result database DB11. This reactive power distribution subject selection result data D11 is included, so that there is an effect that unnecessary distribution to the system status varying every moment can be avoided.

The calculation result of the output distribution as illustrated in FIG. 10 is stored as the output distribution calculation result data D12 in the output distribution calculation result database DB12. Details of FIG. 10 will be described later.

The calculation result of the control instruction value obtained from the output distribution calculation result data D12 is stored as the control instruction value calculation result data D13 in the control instruction value calculation database DB13.

As illustrated in FIG. 11, the probability distributions indicating how much the deviation does not occur as a voltage state and a distribution effect, the frequency of use, the number of times of manipulation, and the like of each control device are stored as the control evaluation result data D14 in the control evaluation result database DB14. With such a configuration, there is an effect that, on the screen as illustrated in FIG. 11, it is possible for the operator to easily grasp whether or not the operator complies with the instruction value and the target value, whether or not the balance between the voltage and the reactive power can be maintained, whether or not the number of times of manipulation can be reduced, and the like. Details of FIG. 11 will be described later.

Next, the contents of the calculation processes of the voltage and reactive power monitoring/control device 10 will be described with reference to FIG. 8. FIG. 8 is an example of a flowchart illustrating the entire processes of the voltage and reactive power monitoring/control device 10. First, the flow will be described in brief, and then, each component will be described in detail.

First, in a fluctuation component calculation process step S31, fluctuation component calculation is performed by using the predicted value data D1 which is a predicted value of the power system information. The result of the fluctuation component calculation is stored as the fluctuation component calculation result data D16 in the fluctuation component calculation result database DB16.

Next, in a required reactive power calculation process step S32, required reactive power calculation is performed by using the fluctuation component calculation result data D16 and the conversion coefficient data D8. The result of the required reactive power calculation is stored as the required reactive power calculation result data D10 in the required reactive power calculation result database DB2.

Next, in a reactive power distribution subject selection process step S33, reactive power distribution subject selection is performed by using the control subject changeable period data D9, the distribution necessity determination reference data D2, the control subject current output value data D3, the control subject output upper-lower limit value/increment value data D4, and the calculated required reactive power calculation result data D10. The result of the reactive power distribution subject selection is stored as the reactive power distribution subject selection result data D11 in the reactive power distribution subject selection result database DB11.

In an output distribution calculation process step S34, output distribution calculation is performed by using the control subject current output value data D3, the control subject output upper-lower limit value/increment value data D4, the reference bus measurement value data D5, the reference bus target value data D6, the control subject sensitivity data D7, the calculated required reactive power calculation result data D10, and the reactive power distribution subject selection result data D11. The result of the output distribution calculation is stored as the output distribution calculation result data D12 in the output distribution calculation result database DB12.

Next, in a control instruction value calculation process step S35, control instruction value calculation is performed by using the reference bus measurement value data D5, the reference bus target value data D6, the control subject sensitivity data D7, and the calculated output distribution calculation result data D12. The result of the control instruction value calculation is stored as the control instruction value calculation data D13 in the control instruction value calculation database DB13.

Next, in an output instruction process step S36, output instruction is performed by using the calculated control instruction value calculation result data D13.

Next, in a process step S37, control evaluation is performed by using the calculated required reactive power calculation result data D10, the reactive power distribution subject selection result data D11, the output distribution calculation result data D12, the control instruction value calculation result data D13, the fluctuation component calculation result data D16. The result of the control evaluation is stored as the control evaluation result data D14 in the control evaluation result database DB14.

Finally, in a screen display process step S11, screen display of one or more of the predicted value data D1, the distribution necessity determination reference data D2, the control subject current output value data D3, the control subject output upper-lower limit value/increment value data D4, the reference bus measurement value data D5, the reference bus target value data D6, the control subject sensitivity data D7, the conversion coefficient D8, the control subject changeable period data D9, the calculated required reactive power calculation result data D10, the reactive power distribution subject selection data D11, the output distribution calculation result data D12, the control instruction value calculation result data D13, the control evaluation result data D14, and the fluctuation component calculation result data D16 is performed. In addition, various calculation results and data accumulated in the memory during the calculation may be sequentially displayed on screens of other monitoring devices. With such a configuration, it is possible for the operator to easily grasp the operation state of the voltage and reactive power monitoring/control device 10. The flow of the above processes will be described step by step. In a case where a situation in which calculation cannot be executed occurs in some of the process steps of FIG. 8, it is preferable to output an alert separately to urge the operator to respond.

Hereinafter, the specific contents of each process will be described. First, in the fluctuation component calculation process step S31, the fluctuation component calculation is performed by using the predicted value data D1 which is the predicted value of the power system information, and the result is stored in the fluctuation component calculation result database DB16.

Herein, an example of the fluctuation component calculation method is described with reference to FIG. 9. In the upper portion of FIG. 9, a waveform of an average voltage Vi is illustrated as the predicted value data D1. The waveform of the average voltage Vi illustrates time-series data of the average value of the voltages of the nodes obtained by the power flow calculation using the power generation plan and the load demand prediction value and the like. The waveform of the average voltage Vi increases and decreases while fluctuating, and thus, it may be considered that the waveform is formed including a short-period fluctuation, a medium-period fluctuation, and a long-period fluctuation. The time-series waveform can be divided into time-series waveforms of respective fluctuation periods by passing the waveform through a preset filter for each fluctuation period of a short period, a medium period, and a long period.

In the example of FIG. 9, a fluctuation 1 is a fluctuation component obtained through a filter for a fluctuation period of the short period, and a difference voltage $\Delta V1$ is obtained as a difference between a maximum value $\Delta V1max$ and a minimum value $\Delta V1min$ in a predetermined time zone of an output of the short-period filter. Similarly, a fluctuation 2 is a fluctuation component obtained through a filter for a fluctuation period of the short period, and a difference voltage $\Delta V2$ is obtained as a difference between a maximum value $\Delta V2max$ and a minimum value $\Delta V2min$ in a predetermined time zone of an output of the short-period filter. A fluctuation 3 is a fluctuation component obtained through a filter for a fluctuation period of the short period and a difference voltage $\Delta V3$ is obtained as a difference between a maximum value $\Delta V3max$ and a minimum value $\Delta V3min$ in a predetermined time zone of an output of the short-period filter. These components are the fluctuation component calculation result data D16.

With such a configuration, there is an effect that it is possible to easily determine how much the fluctuation component has the voltage change width. Herein, the example of the average voltage Vi is illustrated. However, as long as it can be converted into the required reactive power in the required reactive power calculation process step S32, a time-series waveform of a representative voltage may be used, or time-series data of a demand may be used. As the filter for each fluctuation period, any processing device that passes a set fluctuation period or removes other than the set fluctuation period such as a high-pass filter, a low-pass filter, or a band pass filter may be used. With such a configuration, there is an effect that the magnitude of the fluctuation at a desired fluctuation period can be resolved. The filter is configured so that the set fluctuation period of the filter can be adjusted later. With such a configuration, there is an effect that, when a facility changes, the operator can extract the component of the desired fluctuation period corresponding to the facility.

In the required reactive power calculation process step S32, the required reactive power calculation is performed by using the fluctuation component calculation result data D16 stored in the fluctuation component calculation process step S31, and the result is stored in the required reactive power calculation result database DB10. Herein, similarly to the description of the fluctuation component calculation process step S31, the pre-process of the required reactive power calculation method will be described with reference to FIG. 9.

In FIG. 9, the time-series waveforms of the fluctuation periods are indicated by the fluctuation 1, the fluctuation 2, and the fluctuation 3. By calculating the maximum values and the minimum values for the fluctuation periods and calculating the differences, the fluctuation components having the fluctuation widths of $\Delta V1$, $\Delta V2$, and $\Delta V3$ can be calculated. In addition, reactive powers $\Delta Q1$, $\Delta Q2$, and $\Delta Q3$ required for suppressing the voltage fluctuation of the differences $\Delta V1$, $\Delta V2$, and $\Delta V3$ can be calculated by using the conversion coefficient data D8 stored in advance. Herein, the example of the average voltage Vi is illustrated. However, as long as it can be converted into the required reactive power, a time-series waveform of the representative voltage may be used, or a time-series of a demand or the like may be used. In addition, the required reactive power is calculated by performing conversion of each required reactive power. It is preferable that the conversion coefficients are prepared for various types of fluctuations and are prepared for each fluctuation period even though the fluctuation is of the same type.

In the reactive power distribution subject selection process step S33, the reactive power distribution subject selection is performed by using the control subject changeable period data D9, the distribution necessity determination reference data D2, the control subject current output value D3, the control subject output upper-lower limit/increment value D4, and the required reactive power calculation result data D10 calculated in the power calculation process step S32, and the result is stored in the reactive power distribution subject selection result database DB11.

More specifically, first, in a case where satisfying the reference value of the distribution necessity determination reference data D2 is satisfied with respect to the reactive powers $\Delta Q1$, $\Delta Q2$, and $\Delta Q3$ required for suppressing the fluctuations, the process proceeds to the calculation for selecting the reactive power distribution subject. In the distribution necessity determination reference database DB2 illustrated in FIG. 5, as the distribution necessity determination reference data D2, the determination references for distribution necessity for the short-period fluctuation 1, the middle-period fluctuation 2, and the long-period fluctuation 3 are described. Accordingly, since it is less than the determination reference for the short-period fluctuation 1, selection of other than the reactive power distribution subject is performed, and since determination references for the medium-period fluctuation 2 and the long-period fluctuation 3 are satisfied, the selection of the reactive power distribution subject is performed.

With such a configuration, there is an effect that the reactive power distribution for events such as the corresponding unnecessary voltage fluctuation becomes unnecessary. This reference value is set in advance. However, for example, if the reactive power that can be changed both positively and negatively due to a constant load fluctuation is performed sequentially, useless control is performed. For this reason, a reference value that can be determined to exceed the fluctuation is set. The reference values of such fluctuation data may be corrected by the operator by accumulating the system data or may be automatically corrected.

Subsequently, in the reactive power distribution subject selection process step S33, by using the control subject current output value data D3 and the control subject output upper-lower limit value/increment value data D4, it is determined whether or not the control subject has the current adjustment power. More specifically, if the current output of the control subject is the upper limit value or a value close thereto, the output can be adjusted in the decreasing direction but cannot be adjusted in the increasing direction, and thus, in a case where the output is required in the increasing and decreasing directions, the output is removed from the subject. On the other hand, in a case where the required reactive power is required in the decreasing direction, since the control subject has an adjustment power, so that the output is allowed to be included in the subject. The same is applied to the increasing direction. If the current output of the control subject is not the upper limit value or a value close thereto, the output is adjustable and is allowed to be included in the subject.

Finally, in the reactive power distribution subject selection process step S33, the corresponding fluctuation is selected from the changeable periods of each control subject by using the control subject changeable period data D9 retained in advance in the control subject changeable period database DB9. Since the response characteristic (changeable period), the adjustment power, and the like are stored in the control subject changeable period database DB9 for each control subject (controllable equipment) arranged in the power system, it is possible to select a controllable equipment which becomes the reactive power distribution subject. In addition, it is possible to grasp the total adjustment power by the controllable equipment appropriate for suppressing the fluctuation in the fluctuation period, and if the corresponding control subject is insufficient, the control subject for an auxiliary fluctuation period may be retained in advance so that the control subject can be assisted by another control subject having a fluctuation period close to the fluctuation period. With such a configuration, there is an effect that the reactive power distribution subject selection is performed without missing. In a case where the control subject is still insufficient, an alarm is issued. With such a configuration, there is an effect that it is possible to notify the operator of which period fluctuation the reactive power distribution subject is insufficient.

In the output distribution calculation process step S34, the output distribution calculation is performed by using the control subject current output value data D3, the control subject output upper-lower limit value/increment value data D4, the reference bus measurement value data D5, the reference bus target value data D6, the control subject sensitivity data D7, the required reactive power calculation result data D10 stored in the fluctuation component calculation process step S31, and the reactive power distribution subject selection result data D11 stored in the reactive power distribution subject selection process step S33, and the result is stored in the output distribution calculation result database DB12.

Herein, an example of the output distribution calculation method will be described with reference to FIG. 10. In the upper portion of FIG. 10, a distance d is illustrated on the horizontal axis, and a reactive power Q is illustrated on the vertical axis. Reactive power output characteristics G1 and G2 of two generators are exemplified. As illustrated in the upper portion of FIG. 10, in a case where the control subject equipment is a generator, since the increment is so small as to be treated as a continuous value, when a reactive power Qref is illustrated on the vertical axis and a distance d is illustrated on the horizontal axis, the reactive power output characteristics G1 and G2 of the generators can be expressed as straight lines with certain slopes.

In the illustrated example, the upper limit of the reactive power output of the generator G1 at the distance dl is Qg1max, the upper limit of the reactive power output of the generator G2 is Qg2max, the reactive power output of the generator G1 at the distance d0 (initial) is Qg01, and the upper limit of the reactive power output of G2 is Qg02. In this case, since the upper limits Qg1max and Qg2max of the reactive power outputs of the generators G1 and G2 are different from the initial values Qg01 and Qg02, the respective slopes are different. Therefore, when the upper portion of FIG. 10 is created so that the upper limits Qg1max and Qg2max become the same distance, the reactive power distribution value, that is, the reactive power instruction value Qref is calculated by moving the point dk of an arbitrary distance leftward and rightward. The calculation formula of the method of the output distribution calculation will be described later in the control instruction value calculation step S35. With such a configuration, since the reactive power can be equally distributed according to capacity, it is possible to prevent such phenomena that some of the generators first reach the reactive power limit and the voltage stability is extremely deteriorated, and thus, is possible to improve supply reliability.

In the lower portion of FIG. 10, a distance e is illustrated on the horizontal axis, and a reactive power Q is illustrated on the vertical axis. Reactive power output characteristics C1 and C2 of the two reactive power supply devices are exemplified. In the lower portion of FIG. 10, the discrete reactive power supply device is a control subject, but the same effect as that of the upper portion of FIG. 10 can be obtained. However, since the discrete reactive power supply device is the control subject, a stepwise waveform is obtained, and thus, there is a need to treat the increment not continuously but discretely.

In the calculation of the reactive power distribution by the reactive power supply device, it is possible to equally distribute the reactive power amount by moving the distance ek leftward and rightward for each increment and performing calculation. In addition, since the distance is moved leftward and rightward for each increment, the number of times of control can be equally distributed, so that there is an effect that it is possible to allow the number of times of manipulation not to be biased to only one facility. With such a configuration, there is an effect that it is possible to prevent maintenance and inspection of the facility from being biased. Although the control of the reactive power supply device is discrete, the discrete values can be approximated and thus, can be treated as a straight line.

Herein, the upper portion and the lower portion of FIG. 10 are diagrams for calculating the output distribution relating to the generator and the reactive power supply device. With respect to each of the above fluctuations, the output distribution is calculated based on the reactive power distribution subject selected in the reactive power distribution subject selection process step S33. Since the values of the generator and the reactive power supply device are different from each other, it is basic not to solve the distribution calculation at the same time. However, in a case where there is a fluctuation that cannot be compensated if both the generator and the reactive power supply device are not used, a preset weight is used, and devising such as correcting the slope of the straight line in FIG. 10 or shifting the maximum value of the distance dk and the maximum value of the distance ek is performed, so that there is an effect that it is possible to calculate the output distribution appropriate for the value considered by the operator.

In addition, although the generators that can be treated as continuous values and the discrete reactive power supply devices described above are exemplified as the control subject equipments capable of controlling the reactive power, representative ones other than the control subject equipments include an LRT, an SC, and an ShR. Since the LRT moves the tap and the SC and the ShR move an on/off device (switch), these devices are forced to be discrete. In these control subject equipments, it is a reason why it is necessary to discretely manipulate a mechanical mechanism unit such as a tap or a switch.

In the control instruction value calculation step S35, the control instruction value calculation is performed by using the reference bus measurement value data D5, the reference bus target value data D6, the control subject sensitivity data D7, and the output distribution calculation result data D12 stored at the output distribution calculation process step S34, and the result is stored in the control instruction value calculation database 55. The control instruction value can be calculated by solving a quadratic programming method using the output distribution calculated in the output distribution calculation process step S34 and the control subject sensitivity.

The control instruction value may be performed in accordance with a method disclosed in, for example, a document by A. Conejo, M. J. Aguilar (Secondary voltage control: Nonlinear selection of pilot buses, design of an optimal control law, and simulation results, IEE Proc.-Gener. Transm. Distrib., Vol. 145, No. 1. (1998), pp. 77-81), a document by J. L. Sancha, J. L. FernAndez, A. Cortes, and J. T. Abarca (SECONDARY VOLTAGE CONTROL: ANALYSIS, SOLUTIONS AND SIMULATION RESULTS FOR THE SPANISH TRANSMISSION SYSTEM, IEEE, 1995) or the like.

Herein, an example of a quadratic objective function and a linear constraint will be described using the following Formulas of the latter document as an example. Formula (1) is a quadratic objective function, and Formulas (2) to (5) represent upper and lower limit constraints as linear constraints, respectively.

In these series of formulas $\Delta V_p$ is a voltage deviation of a reference bus, $\Delta V_g$ is a voltage correction value of a bus of a control subject equipment, $\Delta Q_g$ is a reactive power deviation of the bus of the control subject equipment, $V_{ps}$ is a voltage of a critical bus of a non-control subject equipment, $C_v$ is a sensitivity matrix relating to a voltage value increment of the control subject equipment and a voltage value increment of the reference bus, $C_{vs}$ is a sensitivity matrix relating to a voltage value increment of the control subject equipment and a voltage value increment of a bus of a load not selected as the reference bus, $C_q$ is a sensitivity matrix relating to a voltage value increment of the control subject equipment and an applied reactive power increment of the control subject equipment, $\alpha$ is a parameter for determining a closed loop time constant, m is a weight parameter for determining relative importance of two constituent elements of the objective function, $V_g^{max}$, $Q_g^{max}$, and $V_{ps}^{max}$ are upper limit constraints, $V_g^{min}$, $Q_g^{max}$, and $V_{ps}^{min}$ are lower limit constraints, and $V_p$ and $V_{ps}$, and $V_g$ and $Q_g$ are real-time measurement values required to calculate the objective function.

[Formula 1]

$$\text{Minimise}\{(\alpha \Delta V_p - C_v \Delta V_g)^2 + m(a\Delta Q_g - C_q \Delta V_g)^2\} \quad (1)$$

[Formula 2]

$$V_g^{min} \leq V_g + \Delta V_g \leq V_g^{max} \quad (2)$$

[Formula 3]

$$Q_g^{min} \leq Q_g + C_q \Delta V_g \leq Q_g^{max} \quad (3)$$

[Formula 4]

$$V_{ps}^{min} \leq V_{ps} + C_{vs} \Delta V_g \leq V_{ps}^{max} \quad (4)$$

[Formula 5]

$$|\Delta V_g| \leq \Delta V_g^{max} \quad (5)$$

Herein, Formula (1) includes two elements. The first one is an element minimizing the deviation of the reference bus voltage, and the second one is an element minimizing the deviation of the reactive power between the control subject equipments from the target value. Formulas (2) to (5) are the upper and lower limit constraints. Each sensitivity matrix corresponds to the control subject sensitivity data and is given by the control subject sensitivity database DB7. With such a configuration, the voltage deviation from the reference bus target value is minimized, and the deviation of the target reactive power determined by the reactive power output distribution on the generators included in the preset zones is minimized.

In addition, as described above in the output distribution calculation process step S34, by performing the output distribution calculation as illustrated in FIG. 10 on the generators included in the respective preset zones, the generators included in the zones are allowed to reach the limit of the reactive power output at the same time. With such a configuration, since the reactive power can be equally distributed according to capacity, it is possible to prevent such phenomena that some of the generators first reach the reactive power limit and the voltage stability is extremely deteriorated, and thus, is possible to improve supply reliability.

Herein, with reference to the upper portion of FIG. 10, the calculation of the reactive power distribution described above in the output distribution calculation process step S34 is supplemented. As described above, in the upper portion of FIG. 10, when the reactive power target value Qref is illustrated on the vertical axis and the distance d is illustrated on the horizontal axis, the reactive power output characteristic of the generator becomes a straight line having a certain slope. Herein, Qg1max and Qg2max are the reactive power upper limit constraints of the generators G1 and G2, and Qg01 and Qg02 are initial reference values of the reactive power of the generators G1 and G2 and are values received from the voltage and reactive power monitoring/control device or set in advance. In addition, d is a free variable of optimization problem. Since the upper limit constraints and the initial operating points of the reactive power output of the generators are different, the slopes thereof are different. Therefore, when creating the upper portion of FIG. 10 so that Qg1max and Qg2max are the same distance d, it is possible to calculate the reactive power distribution value, that is, the reactive power instruction value Qref by moving dk leftward and rightward. At this time, the variable d is allowed to be free, and thus, the deviation of the reactive power indicated by the following Formula (6) is minimized.

[Formula 6]

$$\Delta Q_{gi} = Q_{g0i} + k_i d - Q_{gi} \quad (6)$$

In Formula (6), $\Delta Q_{gi}$ is the reactive power deviation of the control subject equipment i, $\Delta Q g_{0i}$ is the initial reference value of the reactive power of the control subject equipment i, $k_i$ is the set slope of the control subject equipment i, the adjustment of the reactive power depends on the reference, and $Q_{gi}$ is the instantaneous reactive power value of the control subject equipment i.

In addition, a document by A. Conejo, M. J. Aguilar, "Secondary Voltage control: Nonlinear selection of pilot buses, design of an optimal control law, and simulation results", IEE Proc.-Gener. Transm. Distrib., Vol. 145, No. 1. (1998), pp. 77-81 or a document by Omura, Uryo: "Study considering multiple operating points of basic voltage control strategy", Materials of Joint Study Group on Electric Power Technology and Electric Power System Technology, The Institute of Electrical Engineers of Japan, PE-03-122, PSE-03-133, pp. 7-11, 2003 discloses a method of selecting (setting) a reference bus, and the reference bus may be set by using the method of selecting a reference bus or the like disclosed in these documents or the like, or the reference bus may be set in advance. In the case of setting the reference bus in advance, the reference bus may be set according to the knowledge in the related art or may be set again by using the method of the above-described document. The number of reference buses may be decreased or may be increased. With such a configuration, it is possible to set the reference bus appropriately for the current observation point.

By performing the output distribution calculation in the output distribution calculation process step S34 and the control instruction value calculation in the control instruction value calculation process step S35 described above for each fluctuation component with respect to the control subject equipment for the fluctuation component obtained by performing the fluctuation component calculation in the fluctuation component calculation process step S31, performing the required reactive power amount calculation in the required reactive power calculation process step S32, and selecting as the reactive power distribution subject in the reactive power distribution subject selection process step S33, the output distribution and the output instruction can be performed for any fluctuation component, and thus, even though the output fluctuation of the renewable energy or the change of the power source configuration or the system configuration occurs due to the weather along with the elapse of time, it is possible to maintain the balance between the voltage and the reactive power of the power system, and it is possible to improve economic efficiency.

In the output instruction process step S36, the output instruction is performed by using the control instruction value calculation result data D13 stored in the control instruction value calculation process step S35. The transmission destination is, for example, an individual control device 45 for maintaining balance between the voltage and the reactive power in a certain area, and the individual control device 45 receives one or more of the control instruction value calculation result data D13 at a preset period and performs the voltage and reactive power control.

In the control evaluation process step S37, in order to easily check whether or not the operator correctly follows the target value as the calculation of the control evaluation performed by using the required reactive power calculation result data D10 stored in the required reactive power calculation process step S32, the reactive power distribution subject selection result data D11 stored in the reactive power distribution subject selection process step S33, the output distribution calculation result data D12 stored in the output distribution calculation process step S34, and the control instruction value calculation result data D13 stored in the control instruction value calculation process step S35, a deviation between the target voltage and the measured value is calculated, and the result is stored in the control evaluation result database 56.

In addition, in the control evaluation process step S37, probability distributions such as $\Delta V_p$, $\Delta V_g$, and $\Delta Q_{gi}$ indicating how much the voltage state and distribution effect are deviated as illustrated in FIG. 11, a frequency of use, the number of times of manipulation, and the like of each control device are calculated.

With such a configuration, there is an effect that, on the screen 90 as illustrated in FIG. 11, it is possible for the operator to easily grasp whether or not the operator complies with the instruction value or the target value, whether or not the balance between the voltage and the reactive power is maintained, whether or not the number of times of manipulation is reduced, and the like.

In addition, the display example of the screen 90 illustrated in FIG. 11 is an example of a visualized display of the operation state of the power system monitored and controlled by the voltage and reactive power monitoring/control device 10. With respect to the system data, the state such as the time of acquisition is displayed on a small screen 91. The voltage as the measured value at the node (the bus 1 in the example of the figure) selected by the tab together with various constraint conditions (upper limit value of the operation voltage, target voltage width, target voltage) and a current operating point is visualized and displayed on a small screen 92 in a time-series manner. The probability density is displayed on a small screen 93 for each fluctuation element selected by the tab. The number of times of manipulation of each reactive power supply device is compared and displayed on a small screen 94 for the reason of managing a degree of deterioration of the plurality of reactive power supply devices. In addition, although not illustrated in the figure, it is preferable that display of the distribution level of the reactive power Q illustrated in FIGS. 9 and 10, display of the distribution effect by the distribution, display of the extent of deviation in the case of the probability distribution, display of the frequency of use and the number of times of manipulation of each control device, or a display to clearly indicate what kind of countermeasure is necessary in which band as a screen also displaying a trend, display of a countermeasure equipment in this case, display of insufficient capacity, and the like are also performed.

In the screen display process step S11, the screen display of one or more of the predicted value data D1, the distribution necessity determination reference data D2, the control subject current output value data D3, the control subject output upper-lower limit value/increment value data D4, the reference bus measurement value data D5, the reference bus target value data D6, the control subject sensitivity data D7, the required reactive power calculation result data D10 stored in the required reactive power calculation process step S32, the reactive power distribution stored in the reactive power distribution subject selection process step S33 The target selection result data D11, the output distribution calculation result data D12 stored in the output distribution calculation process step S34, the control instruction value calculation result data D13 stored in the control instruction value calculation process step S35, and the control evaluation result data D14 stored in the control evaluation process step S37 is performed.

As illustrated in FIG. 11, the probability distribution indicating how much the deviation does not occur as a voltage state or a distribution effect, the frequency of use, the number of times of manipulation, and the like of each control device are stored. With such a configuration, there is an effect that, on the screen as illustrated in FIG. 11, it is possible for the operator to easily grasp whether or not the operator complies with the instruction value and the target value, whether or not the balance between the voltage and the reactive power can be maintained, whether or not the number of times of manipulation can be reduced, and the like. In addition, in calculating the target value and the control amount of the voltage and reactive power monitoring/control device of the power system, it is possible to reduce the labor for weighting when using a plurality of objective functions.

Second Embodiment

Although the present invention discloses the system configuration including the central device for monitoring and controlling the power system and the individual control device installed at an individual location of the power system and operated by the transmission data from the central device, it is considered that the central device in the second embodiment described with reference to FIGS. 12 to 15 cooperates with the central power supply instruction station that performs monitoring and controlling the entire power system or is installed in the central power supply instruction station to perform intra-area control.

In this case, the voltage and reactive power monitoring/control device 10, which is the central device of the second embodiment, treats the data possessed by the central power supply instruction station, and the data obtained from the power system are also more various.

In the second embodiment, since one or more calculation units for the predicted value data D1 and the reference bus target value data D6 according to the first embodiment are provided, the second embodiment is different from the first embodiment in terms of the input data, the configuration, the program, and the control flow.

As a result, according to the first embodiment, even if it becomes impossible to receive the predicted value data D1 and the reference bus target value data D6 from the other device, it is possible to provide one or both of the effects of maintaining balance between the voltage and the reactive power and improving the economic efficiency in the power system by only the voltage and reactive power monitoring/control device 10. Hereinafter, an example of the voltage and reactive power monitoring/control device according to the second embodiment will be described. However, descriptions of the same operations at the same components as those of the first embodiment will be omitted.

FIG. 13 is a diagram illustrating an overall configuration example of the power system and a hardware configuration of the voltage and reactive power monitoring/control device according to the second embodiment of the present invention. The overall configuration of the power system of FIG. 13 is basically the same as the overall configuration of the power system of FIG. 2. However, the data transmitted from the power system to the voltage and reactive power monitoring/control device 10 newly includes the system measurement data D17 in addition to the reference bus measurement value data D5. The system measurement data D17 is a measurement data at an arbitrary location of the power system and is a measurement data in a wider range and broad sense, which also includes the reference bus measurement value data D5 which is data measured with the reference bus. As a result, even in a state where it is difficult to acquire the reference bus measurement value data D5 due to some circumstances, the measurement data of the reference bus can be estimated from the system measurement data D17. In addition, the power system to be monitored and controlled may be the entire power system or any of the segmented areas.

With respect to the hardware configuration of the voltage and reactive power monitoring/control device 10, in the second embodiment, two new databases DB are additionally provided. These are a system measurement database DB17 and a system facility database DB18 positioned in the input side database DBI of FIG. 1.

FIG. 12 is a diagram in which the voltage and reactive power monitoring/control device 10 is described by the processing functions therein and corresponds to FIG. 1 of the first embodiment. The different point in configuration is that, as the processing functions, a status estimation calculation unit 38, a predicted value calculation unit 39, and a reference bus target value calculation unit 40 are added to the calculation unit 41. In addition, the input side database DBI of FIG. 12 includes the system measurement database DB17 and the system facility database DB18. In addition, since the results of the predicted value calculation unit 39 and the reference bus target value calculation unit 40 are input data of the subsequent process, the results are stored in the input side database DBI. However, in some cases, the results may also be referred to as a result side database DBO.

FIG. 14 is a diagram illustrating a program configuration corresponding to FIG. 3, and a different point in configuration is that a status estimation calculation program P38, a predicted value calculation program P39, and a reference bus target value calculation program P40 are added in the program database DB15.

The above major different points will be described in detail below. First, as a premise thereof, the system measurement data D17 will be described. In addition, the reference bus measurement value data D5 is positioned as the data measured at the reference bus, but the system measurement data D17 may be regarded as a wider-range measurement data without specifying the measurement position. Similarly to the reference bus measurement value data D5, the system measurement data D17 of FIG. 13 and the like is data of any one or a plurality of a node voltage V, a branch current I, a power factor $\phi$, an active power P, and a reactive power Q measured by the measurement device 44 and is received via the communication network 300 and stored in the system measurement database DB17. However, instead of receiving the system data directly from the measurement device 44, the system data may be collected at once by other monitoring devices and, after that, may be stored in the system measurement database DB17 via the communication network 300. Alternatively, the system data may be stored in the system measurement database DB17 from the measurement device 44 or other monitoring devices via the communication network 300. In addition, the system measurement data D17 may include a unique number for identifying data and a time stamp. In addition, the other monitoring devices are, for example, a central power supply instruction station, a system stability monitoring server, and the like.

Next, the system facility data D18 will be described. A system configuration, a line impedance (R+jX), a ground capacitance (admittance: Y), a power source data, and the like are included and stored as the system facility data D18 in the system facility database DB18 of FIG. 13 and the like. In addition, the system configuration includes connection relations of one or a plurality of the bus, the transmission line, the power source, the load, the transformer of the system and the respective control devices. In addition, the system facility data D18 may be obtained from the monitoring/control device, the central power supply instruction station, or the EMS or may be manually input. In manually inputting, the data is manually input and stored by the input unit 12. In addition, in inputting, necessary image data may be generated by the CPU 14 and may be displayed on the display unit 11. In inputting, the inputting may be semimanually performed so that a large amount of data can be set by using a complementary function.

By using the system measurement data D17 and the system facility data D18, additional processes occur in the second embodiment in comparison with the calculation process contents of the first embodiment. In FIG. 15 which is an example of a flowchart illustrating the entire processes of the power system voltage and reactive power monitoring/control device 10, the portions where the calculation is added will be described.

In the flowchart illustrated in FIG. 15, the series of processes from the process step S31 to the process step S37 and the process step S11 are the same as those in the first embodiment. In the second embodiment, steps S38, S39, and S40 are added as the pre-processes.

In the status estimation calculation process step S38 of FIG. 15, the system status at the time of the system measurement is calculated by the calculation of the status estimation calculation program P38 added to FIG. 14 by using the system measurement data D17, the system facility data D18, and appropriately set calculation setting data, and the status estimation calculation result is stored. The status estimation calculation result may be stored at an appropriate location in the storage device. However, if necessary, a status estimation calculation result database may be provided as a dedicated database.

In addition, the status estimation calculation by the status estimation calculation program P38 is a calculation function of determining whether or not an abnormal data exists in an observation data and eliminating the abnormal data based on the observation data and the connection data of substations, power plants, and a power transmission/distribution equipment starting from a transmission line and estimating a likely system status at a specific time cross-section. Herein, the status estimation calculation may be performed in accordance with various methods disclosed in, for example, a document by Lars Holten, Anders Gjelsvlk, Sverre Adam, F. F. Wu, and Wen-Hs lung E. Liu, "Comparison of Different Methods for Status estimation", IEEE Transaction on Power Systems, Vol. 3 (1988), pp. 1798-1806.

In the predicted value calculation process step S39, the prediction calculation of the future system status from the time of the system measurement is performed by the predicted value calculation program P39 by using the status estimation calculation result data, the total demand prediction result data, the generator fuel consumption characteristic data, the data of the ratio of the substation load to the total demand, and the substation load PQ correlation data, and the system status is stored in the predicted value database DB1. For example, the total demand prediction result data may be calculated in accordance with a demand prediction method disclosed in a document by Ryoichi Hara, "Analysis and prediction technique of time-series data related to supply and demand operation of power system", Journal of the Institute of Electrical Engineers of Japan, B, Vol. 134, No. 4, 2014, pp. 276-279, a method disclosed in a document by Kenichi et al., "Development of short-term ahead power demand prediction method", Joint Study Group on Electric Power Technology and Electric Power System. Technology, The Institute of Electrical Engineers of Japan, PE-08-120, PSE-08-129, 2008, pp. 25-28, and the like. Alternatively, the total demand prediction result data to be performed at the central power supply instruction station may be periodically obtained via the communication network 300 or may be set in advance.

In the case of the second embodiment, it is assumed that the voltage and reactive power monitoring/control device 10, which is the central device, cooperates with a central power supply instruction station which performs monitoring and controlling the entire power system or is installed at the central power supply instruction station to perform intra-area control. However, the data to be mainly used in the status estimation calculation process step S38 and the predicted value calculation process step S39 can be obtained by cooperation with the central power supply instruction station.

The predicted value calculation in the predicted value calculation process step S39 can be performed in accordance with, for example, a method disclosed by Takahiro Ishida, et al., "Predictive Preceding Voltage and Reactive Power Control Scheme to Key System Using LP Method", Electrotechnical Theory B, Vol. 117, No. 8, 1997, pp. 1116-1120.

More specifically, the generator active power output of each generator is predicted and calculated from the total demand prediction result data and the generator fuel consumption characteristic data by using ELD (economic load distribution). In addition, the substation individual active power load is predicted and calculated from the total demand prediction result data and the data of the ratio of the substation load to the total demand by using Formula (7). In addition, in Formula (7), $P_{li}$ is the prediction result of the active power load of the substation i, $P_{all}$ is the prediction result of the total demand, and $ratio_i$ is the ratio of the active power load of the substation i to the total demand.

[Formula 7]

$$P_{li} = P_{all} \times ratio_i \quad (7)$$

In addition, the substation individual reactive power load is estimated and calculated from the prediction result of the substation individual active power load and the substation load PQ correlation data by using Formula (8). In Formula (8), $Q_{li}$ is the prediction result of the reactive power load of the substation i, and $f_i$ is the PQ correlation of the substation i.

[Formula 8]

$$Q_{li} = f_i(P_{li}) \quad (8)$$

In addition, the power flow state in the future time cross-section from the prediction result of the generator active power output, the prediction result of the substation individual active power load, and the prediction result of the substation individual reactive power load by using an AC power flow calculation method. Thus, the predicted value data D1 can be obtained. Herein, the AC power flow calculation method can be performed in accordance with, for example, a method disclosed by William F Tinney and Clifford E Hart, Power Flow Solution by Newton's Method, IEEE Transaction on Power Apparatus and Systems, Vol. PAS-86, No. 11 (1967) pp. 1449-1967.

In the reference bus target value calculation process step S40, the reference bus target value calculation is performed by using the predicted value data D1, the status estimation result data, and the system facility data D18. As described in the first embodiment, the reference bus target value may be calculated in an offline manner in accordance with a method or the like disclosed in Voltage Stability Maintenance Measures of the Electric Power System, in "Technical Report 11-73 of the Institute of Electrical Engineers of Japan, pp. 10-14 (1979) or may be calculated in accordance with a method or the like disclosed in a document by Junki Someya et al., "Study of optimum control of reference voltage by interior point method in East Japan power system", 2003, National Convention of the Institute of Electrical Engineers of Japan, 6-159, pp. 273-274. With such a configuration, it is predicted that the output of renewable energy fluctuates due to the weather along with the elapse of time, the output distribution and the output instruction can be performed for any fluctuation component, so that it is possible to maintain the balance between the voltage and the reactive power of the power system, and it is possible to improve economic efficiency.

Third Embodiment

In a third embodiment, as the contents of the control evaluation in step S37 performed by the control evaluation unit 37 in the first or second embodiment, an example of a screen of a trend display of the required reactive power, the future prediction, the current/past reactive power equipment capacity, and the future required equipment capacity is additionally illustrated. The equipment configuration and the evaluation flow are the same as those in the first embodiment or the second embodiment.

The display example of the screen 90 illustrated in FIG. 16 is an example of display of visualization of the evaluation result of the voltage and reactive power monitoring/control device 10. On the small screen 95, with respect to the evaluation result calculation content, the insufficient amount of the reactive power at the prediction time and the proposal 1 that the generator G4 should be additionally used as a countermeasure therefor are displayed. On the small screen 96, with respect to the fluctuation selected on the tab, the required reactive power ΔQ is displayed together with the past value, the predicted value, the equipment capacity, and the required equipment capacity along with the elapse of time. In addition, for each generator, the magnitudes of the equipment capacity and the required equipment capacity are displayed. Therefore, there is an effect that it is easier for an operator to grasp the trend, and thus, it is easier to make a decision.

By using the screen of FIG. 16, there is an effect that it is possible for the operator to easily determine how much the required reactive power ΔQ exists for which fluctuation, whether or not the past was allowed, and whether or not the required reactive power is insufficient in the future. In addition, in a case where the required reactive power was insufficient or is to be insufficient in the future, the operator selects the smallest control subject equipment which is to exceed and displays the control subject equipment as a proposal, so that there is an effect that the operator can easily determine required equipment specifications. In addition, how much the required reactive power will be generated in the future is calculated by a regression equation using a past data or the like.

REFERENCE SIGNS LIST

10: voltage and reactive power monitoring/control device
12: input unit
13: communication unit
14: CPU
15: memory
DB1: predicted value database (predicted value data D1)
DB2: distribution necessity determination reference database (distribution necessity determination reference data D2)
DB 3: control subject current output value database (control subject current output value data D3)
DB 4: control subject output upper-lower limit value/ increment value database (control subject output upper-lower limit value/increment value data D4)
DB 5: reference bus measurement value database (reference bus measurement value data D5)
DB 6: reference bus target value database (reference bus target value data D6)
DB 7: control subject sensitivity database (control subject sensitivity data D7)
DB 8: conversion coefficient database (conversion coefficient data D8)
DB 9: control subject changeable period database (control subject changeable period data D9)
31: fluctuation component calculation unit
32: required reactive power calculation unit
33: reactive power distribution subject selection unit
34: output distribution calculation unit
35: control instruction value calculation unit
36: output instruction unit
37: control evaluation unit
40: input system database
41: calculation unit
42: result system database
43: bus line
44: measurement device
45a, 45b: individual control device
46a, 46b, 46c, 46d, 46e: control device
DB10: required reactive power calculation result database (required reactive power calculation result data D10)
DB11: reactive power distribution subject selection result database (reactive power distribution subject selection result data D11)
DB12: output distribution calculation result database (output distribution calculation result data D12)
DB13: control instruction value calculation result database (control instruction value calculation result data D13)
DB14: control evaluation result database (control evaluation result data D14)
DB15: program database (program data D15)
DB16: fluctuation component calculation result database (fluctuation component calculation result data D16)
71: reception data (reference bus measurement value data D5)
72: transmission data (output command value calculation result data D13)

100: transmission system
110a, 110b: power supply
120a, 120b, 120c, 120d, 120e, 120f, 120h, 120i, 120j: node
130a, 130b, 130c, 130d, 130e: transformer
140b, 140e, 140f, 140g, 140h: branch
150a, 150b, 150c: load
160a, 160b, 160c, 160d: power condenser
170a, 170b: shunt reactor
300: communication network

The invention claimed is:

1. A voltage and reactive power monitoring/control device which is applied to a power system including a control subject equipment capable of adjusting a reactive power, and which monitors and controls a voltage and the reactive power, comprising:
a storage device storing a plurality of programs; and
a processor, the processor configured to execute the plurality of programs to perform steps of:
calculating a fluctuation component of a predicted value of data obtained from the power system;
obtaining the reactive power required for suppressing the fluctuation component as a required reactive power amount;
selecting a reactive power distribution subject equipment among a plurality of control subject equipment;
performing output distribution calculation of the required reactive power amount for the selected power distribution subject equipment;
calculating a control instruction value for each control subject equipment from an output distribution calculation result determined for the selected power distribution subject equipment;
calculating the fluctuation components in a plurality of periods in calculating the fluctuation component of the predicted value of the data obtained from the power system, and
determining the fluctuation component to be suppressed by the reactive power and the fluctuation component to not be suppressed among the fluctuation components in the plurality of periods to obtain the required reactive power amount for the fluctuation component to be suppressed by the reactive power.

2. The voltage and reactive power monitoring/control device according to claim 1, wherein
the predicted value of the data obtained from the power system is the voltage of the power system, and the required reactive power amount is obtained by conversion into the reactive power by using a conversion coefficient stored in advance.

3. The voltage and reactive power monitoring/control device according to claim 1, wherein
the reactive power distribution subject selection unit selects the reactive power distribution subject equipment by taking into consideration an adjustment power of the plurality of control subject equipment with respect to the required reactive power amount.

4. The voltage and reactive power monitoring/control device according to claim 1, wherein
the reactive power distribution subject selection unit selects the reactive power distribution subject by taking into consideration a changeable period of the plurality of control subject equipment and a period of the fluctuation component.

5. The voltage and reactive power monitoring/control device according to claim 4, wherein the changeable period of the plurality of control subject equipment corresponds to information indicating whether or not suppressing the fluctuation component in a particular period is appropriate for each control subject equipment.

6. The voltage and reactive power monitoring/control device according to claim 1, wherein, in a case where the control subject equipment is a generator, the output distribution calculation unit distributes the required reactive power according to capabilities of a plurality of the generators to be output distribution subjects.

7. The voltage and reactive power monitoring/control device according to claim 1, wherein
in a case where the control subject equipment is a discrete reactive power supply device including a mechanical mechanism unit, the output distribution calculation unit distributes the required reactive power so that the number of times of manipulation of the mechanical mechanism unit of a plurality of the reactive power supply devices to be output distribution subjects is not biased.

8. The voltage and reactive power monitoring/control device according to claim 1, further comprising a display unit visualizing and displaying an operation state of the power system monitored and controlled by the voltage and reactive power monitoring/control device.

9. The voltage and reactive power monitoring/control device according to claim 8, wherein
the display unit visually displays at least one or more of a time acquired for the data of the system, a relationship between a node voltage and constraint conditions (upper and lower limit values of an operation voltage, a target voltage width, and a target voltage), a probability density of the fluctuation component, and the number of times of manipulation of the reactive power supply device.

10. The voltage and reactive power monitoring/control device according to claim 8, wherein
the display unit visually displays at least one or more of a distribution status of the required reactive power, a distribution effect by the distribution, a degree of deviation in the case of probability distribution, a frequency of use of each control device, display of the number of times, a relationship between a countermeasure and a band, a countermeasure equipment, and an insufficient capacity.

11. The voltage and reactive power monitoring/control device according to claim 8, wherein
the display unit visually displays at least one or more of data used for monitoring and controlling by the voltage and reactive power monitoring/control device.

12. The voltage and reactive power monitoring/control device according to claim 1, wherein
the output instruction unit gives the obtained control instruction value to the control subject equipment to control the power system.

13. The voltage and reactive power monitoring/control device according to claim 1, wherein
the display unit visually displays at least one or more of an insufficient amount of the reactive power at a prediction time point, a proposal of a countermeasure, a past value and a predicted value of the required reactive power $\Delta Q$ for each fluctuation component, and time elapse of a control subject equipment capacity and a required equipment capacity.

14. A voltage and reactive power monitoring/control device which is applied to a power system including a control subject equipment capable of adjusting a reactive power, and which monitors and controls a voltage and the reactive power, comprising:

a storage device storing a plurality of programs; and
a processor, the processor configured to execute the plurality of programs to perform steps of:
calculating a system status at a time of power system measurement by using a measurement data of the power system and data of a system facility of the power system, to obtain a status estimation calculation result;
predicting a future system status from the time of power system measurement by using data of the status estimation calculation result and a prediction data of power generation and load of the power system to obtain a predicted value;
calculating a fluctuation component of a predicted value of data obtained from the power system;
obtaining the reactive power required for suppressing the fluctuation component as a required reactive power amount;
selecting a reactive power distribution subject equipment among a plurality of control subject equipment;
performing output distribution calculation of the required reactive power amount for the selected reactive power distribution subject equipment;
calculating a control instruction value for each control subject equipment from an output distribution calculation result determined for the selected reactive power distribution subject equipment;
calculating the fluctuation components in a plurality of periods in calculating the fluctuation component of the predicted value of the data obtained from the power system, and
determining the fluctuation component to be suppressed by the reactive power and the fluctuation component to not be suppressed among the fluctuation components in the plurality of periods to obtain the required reactive power amount for the fluctuation component to be suppressed by the reactive power.

15. A voltage and reactive power monitoring/control method which is applied to a power system including a control subject equipment capable of adjusting a reactive power, and which monitors and controls a voltage and the reactive power, comprising:

obtaining a fluctuation component of a predicted value of data obtained from the power system and obtaining the reactive power required for suppressing the fluctuation component as a required reactive power amount;
selecting a reactive power distribution subject among a plurality of control subject equipment;
performing output distribution calculation of the required reactive power amount for the selected reactive power distribution subject equipment;
calculating a control instruction value for each control subject equipment from an output distribution calculation result determined for the selected reactive power distribution subject equipment;
calculating the fluctuation components in a plurality of periods in calculating the fluctuation component of the predicted value of the data obtained from the power system; and
determining the fluctuation component to be suppressed by the reactive power and the fluctuation component to not be suppressed among the fluctuation components in the plurality of periods to obtain the required reactive power amount for the fluctuation component to be suppressed by the reactive power.

16. A voltage and reactive power monitoring/control method which is applied to a power system including a control subject equipment capable of adjusting a reactive power, and which monitors and controls a voltage and the reactive power, comprising:

calculating a system status at a time of power system measurement by using a measurement data of the power system and data of a system facility of the power system;
performing prediction calculation of a future system status from a time of power system measurement by using data of a calculation result of the system status at the time of power system measurement and a prediction data of power generation and load of the power system;
obtaining a fluctuation component of a predicted value of data obtained from the power system, obtaining the reactive power required for suppressing the fluctuation component as a required reactive power amount, and selecting a reactive power distribution subject among a plurality of control subject equipment;
performing output distribution calculation of the required reactive power amount for the selected reactive power distribution subject equipment;
calculating a control instruction value for each control subject equipment from an output distribution calculation result determined for the selected reactive power distribution subject equipment;
calculating the fluctuation components in a plurality of periods in calculating the fluctuation component of the predicted value of the data obtained from the power system, and
determining the fluctuation component to be suppressed by the reactive power and the fluctuation component to not be suppressed among the fluctuation components in the plurality of periods to obtain the required reactive power amount for the fluctuation component to be suppressed by the reactive power.

* * * * *